United States Patent [19]

Crewe et al.

[11] 4,314,329
[45] Feb. 2, 1982

[54] METHOD AND APPARATUS FOR USING A COMPUTER NUMERICAL CONTROL TO CONTROL A MACHINE CYCLE OF OPERATION

[75] Inventors: David W. Crewe, Halifax, England; Stephen P. Hill-Harriss, Cincinnati, Ohio

[73] Assignee: Cincinnati Milacron Inc., Cincinnati, Ohio

[21] Appl. No.: 118,644

[22] Filed: Feb. 4, 1980

[51] Int. Cl.³ ............................................. G05B 19/18
[52] U.S. Cl. .................................. 364/141; 364/474; 364/900; 364/167
[58] Field of Search ........ 364/104, 474, 200 MS File, 364/900 MS File; 318/569

[56] References Cited

U.S. PATENT DOCUMENTS

| | | | |
|---|---|---|---|
| 3,701,113 | 10/1972 | Chace et al. | 364/104 X |
| 3,810,104 | 5/1974 | Markley | 364/900 |
| 3,827,030 | 7/1974 | Seipp | 364/900 |
| 4,029,950 | 6/1977 | Haga | 364/104 |
| 4,034,354 | 7/1977 | Simmons | 364/900 |
| 4,038,533 | 7/1977 | Dummermuth et al. | 364/900 X |
| 4,058,711 | 11/1977 | Ondercin et al. | 364/900 X |
| 4,078,259 | 3/1978 | Soulsby | 364/900 |
| 4,107,785 | 8/1978 | Seipp | 364/104 |
| 4,165,534 | 8/1979 | Dummermuth et al. | 364/104 X |

Primary Examiner—Joseph F. Ruggiero
Attorney, Agent, or Firm—John W. Gregg

[57] ABSTRACT

A computer control is utilized to exclusively control the cycles of operation of a machine. The computer control contains a memory for storing a part program defining a number of independent machine processes. Each machine process is defined by a series of machine functions. In accordance with the execution of a part program or the exercise of pushbuttons, the control requests the execution of a machine process. An instruction block defining the first function in the process is examined, and the actual states of selected input signals defining the current machine conditions are compared to predetermined states. If there is a difference between the actual and predetermined states of the selected input signals, an error signal is generated identifying the selected input signals which are in error. If the actual and predetermined states are the same, an output signal is transferred to the machine to actuate a device thereby executing the first function. In addition, a further input signal may be tested which is activated by the execution of the mechanism function; and if the machine device which is responsive to the output signal has failed to operate, an error signal is generated. The other functions in the requested process are successively called and processed until the requested machine process is fully executed. The system is capable of executing a plurality of processes simultaneously.

20 Claims, 17 Drawing Figures

METHOD AND APPARATUS FOR USING A COMPUTER NUMERICAL CONTROL TO CONTROL A MACHINE CYCLE OF OPERATION

BACKGROUND OF THE INVENTION

The invention relates generally to the area of machine controls; and specifically, the invention provides a method and apparatus for selectively executing independent processes during a cycle of operation. The invention may be applied to any type of machinery having a computer based control, however, the preferred embodiment will disclose the application of the invention to a machine tool having a computer numerical control.

The control of a machine tool may be divided into two general areas—a machine slide control and a machine process control. The machine slides control the relative position between the workhead and the workpiece. The relative position is defined by a part program and control is executed by a servomechanism. At different points within a slide positioning cycle, different machine processes may be required, e.g. tool change, spindle start and stop, coolant control, etc. Although synchronized with the machine slide controls, the machine process control is typically an independent process.

For years the logic and operation of machine cycles were controlled by circuits of electro-mechanical relays located with the machine but separate from the numerical control. During the last fifteen years, programmable controllers have been used extensively to replace the relay circuits. Programmable controllers have the advantages of being more reliable, generally less expensive and more flexible in their programming. However, with the increased capabilities of a computer numerical control, many of the machine processes have been integrated into its operation. One approach has been to implement the operation of a programmable controller in the computer numerical control. In this case, special interface circuits are designed which operate in conjunction with the numerical control to emulate the operation of the programmable controller.

Another approach is to design tailored special programs which are operable strictly within the computer numerical control to control many of the dedicated machine functions, e.g. spindle functions, tool change functions, etc. The computer numerical control executes these functions as they are required in a typical part program. However, experience has proven that tailored machine function programs within the numerical control have certain disadvantages. First, many end users require slightly different modes of operation to make the machine tool cooperate with the end users overall manufacturing process. Further, different areas of the United States as well as other countries have differing standards which require modifications in the operation of the machine cycles.

Therefore, an object of the invention is to provide a machine cycle controller which is integrated within the computer numerical control but is more general, more flexible and more easily utilized and changed by the machine tool builder.

Another object of the invention is to provide a wide variety of diagnostic features for specifically monitoring machine signals which are required to execute a particular function as well as other machine signals which result from the execution of the machine functions.

A further object of the invention is to provide a system which only monitors the particular devices on the machine which are required for the execution of a current machine process. This is in contrast to systems which sequentially scan all the devices on the machine on a continuous basis.

SUMMARY OF THE INVENTION

In accordance with one embodiment of the invention, a method and apparatus are provided for executing machine cycles of operation using a computer based control. The control includes a machine interface for receiving the states of input signals produced by condition sensing devices on the machine and transmitting output signals to actuate machine mechanisms thereby executing a machine function. A memory is provided for storing a program represented by groups of process signals, each process signal defining an independent machine process required for the cycle of operation. Each machine process is further defined by a series of instruction blocks of machine function information wherein a number of the instruction blocks define an output signal to be produced in response to predetermined states of selected input signals. The control includes means for activating the process signals as required for the machine cycle of operation. The instruction blocks in each active process are recalled, and the machine functions described thereby are executed. Upon recalling one of the number of the instruction blocks, the machine interface is tested to determine the actual state of the selected input signals. The actual states are compared with the predetermined states of the selected input signals; and if they are not the same, an error signal is generated identifying the faulty input signals. If the actual states and the predetermined state are the same, the output signal is transferred to the machine interface to execute the machine function defined by the instruction block. This process is iterated for all of the number of instruction blocks within a particular active process as well as for the other active processes.

DESCRIPTION OF THE PREFERRED EMBODIMENT

Figure 1:
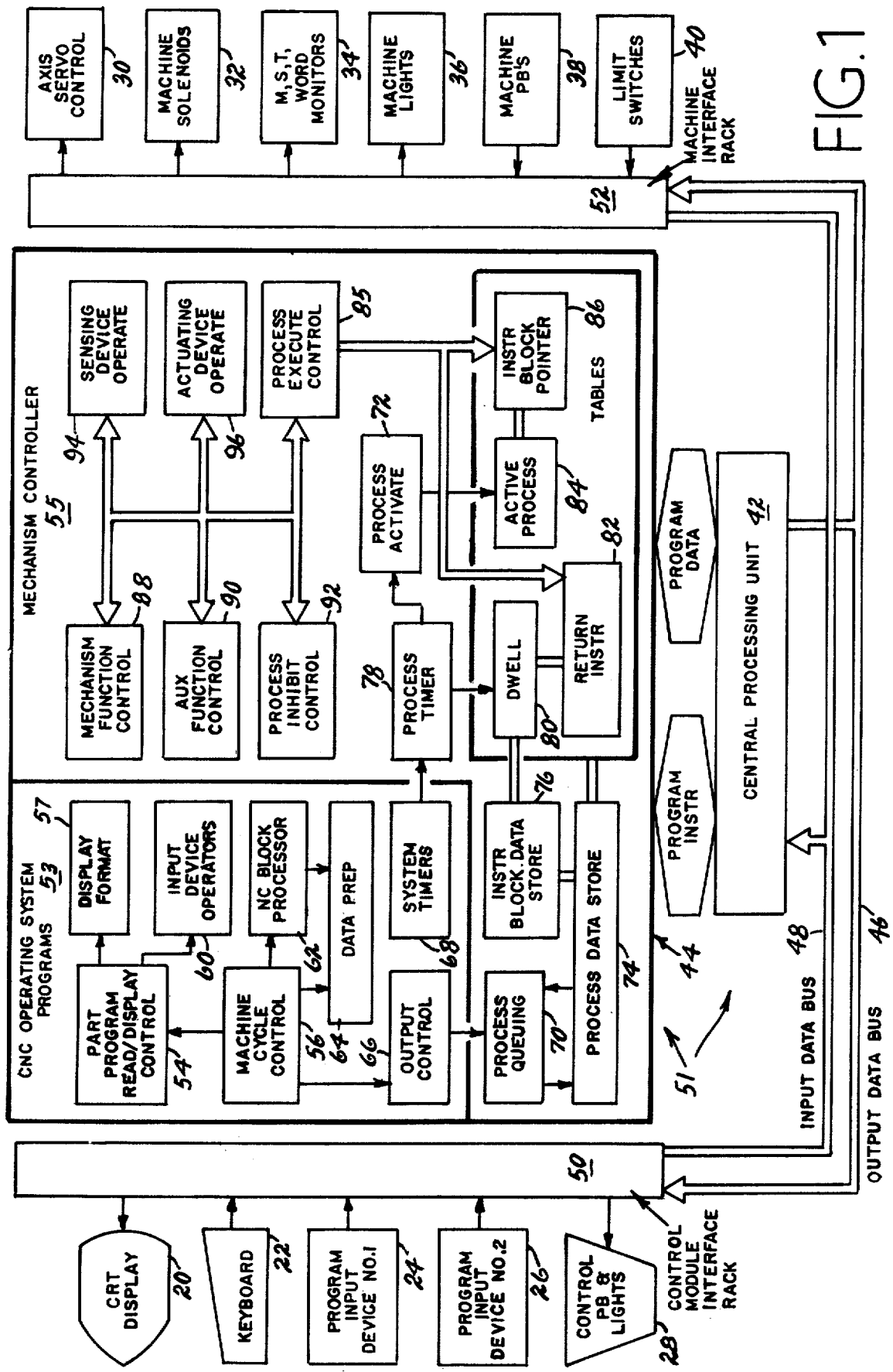
FIG. 1 is a general block diagram illustrating a computer numerical control including the mechanism controller.

FIG. 1 is a general block diagram illustrating the architecture of a computer numerical control in which the invention may be embodied. While the particular components depicted in this FIG. are those used in the computer numerical control manufactured by Cincinnati Milacron Inc., the invention may be implemented in any computer numerical control including equivalent components. Consequently, architectural details should not be construed as limitations on the methods claimed in this invention.

The primary communicative link between the operator and the control is the set of control console devices including the CRT display 20, the keyboard 22, the program input devices 24 and 26 and the control pushbuttons and lights 28. These devices are in turn coupled to the computer 51 through the control module interface rack 50. All information exchanged between these devices and the computer is carried over the input data bus 48 and the output data bus 46. These busses consist of eight parallel signal lines. Communication between the machine and the control by which means the control monitors machine conditions and commands machine operation is accomplished through the set of machine interfaces including axis servocontrol 30, machine solenoids 32, machine, spindle and tool (MST) monitors 34, machine lights 36, machine pushbuttons 38 and limit switches 40. These machine devices are in turn coupled to the computer through the machine interface rack 52 and all information exchanged between these devices and the computer is again carried by the input data bus 48 and the output data bus 46. The computer consists basically of a central processing unit 42 which interprets program instructions and manipulates program data, and the memory 44 in which program instructions and program data are stored. Programs stored in memory are characterized as belonging to one of two primary systems. The first of these, the CNC operating system 53 includes all the programs necessary to direct the overall operation of the control. The mechanism controller 55 includes all the programs necessary to direct the operation of machine mechanisms exclusive of the slides and including such devices as spindle transmissions, tool change mechanisms and workpiece pallet mechanisms.

Each mechanism operation is described by an independent sequence called a machine process made up of elementary instruction blocks representing machine functions which are executed by the computer under control of the mechanism controller programs. The elementary instruction blocks are of four types called mechanism functions, machine processes, auxiliary functions, and process inhibits. Mechanism function blocks allow the machine tool builder to specify delay periods and logical combinations of input contacts, to alter the states of output contacts, and to verify the operation of mechanisms by monitoring input states driven by switches on the machine. Machine process blocks allow the machine tool builder to request the execution of another machine process as part of the execution of a first machine process. The auxiliary function blocks allow the machine tool builder to control the execution of certain machine functions, to control spindle speeds, spindle gear selection, and tool change operations by using a few dedicated functions, and to perform counting operations. Process inhibit blocks allow the machine tool builder to specify that the execution of a process be suspended pending the completion of a function which is part of the execution of another process. The machine tool builder's design of the mechanism controller operation is accomplished by building up collections of data describing the desired machine processes, each of which is comprised of a series of elementary instruction blocks. This data is ultimately represented by signals which reside in the process data store 74 and the instruction block data store 76.

The control system initiates a machine process to operate a machine mechanism in response to three types of activites. First, a mechanism operation may be required for completion of the execution of a machine cycle called for by a part program. Second, the operator may direct mechanism operation by actuating machine mounted pushbuttons, and third a mechanism operation may require that the execution of one process include the execution of other processes. For example, a spindle gear change process may require the execution of the spindle stop and spindle start processes.

A selective activation of processes is accomplished by assigning a process level indicator to each process, and process execution is initiated first for the process assigned the highest level. In applicant's preferred embodiment, up to 12 process levels may be assigned. Only one process may be executed on a level at a time. Therefore, if several processes having the same level are requested, the first process requested will be activated first; and the other processes will be queued until the activated process is complete.

Figure 2:
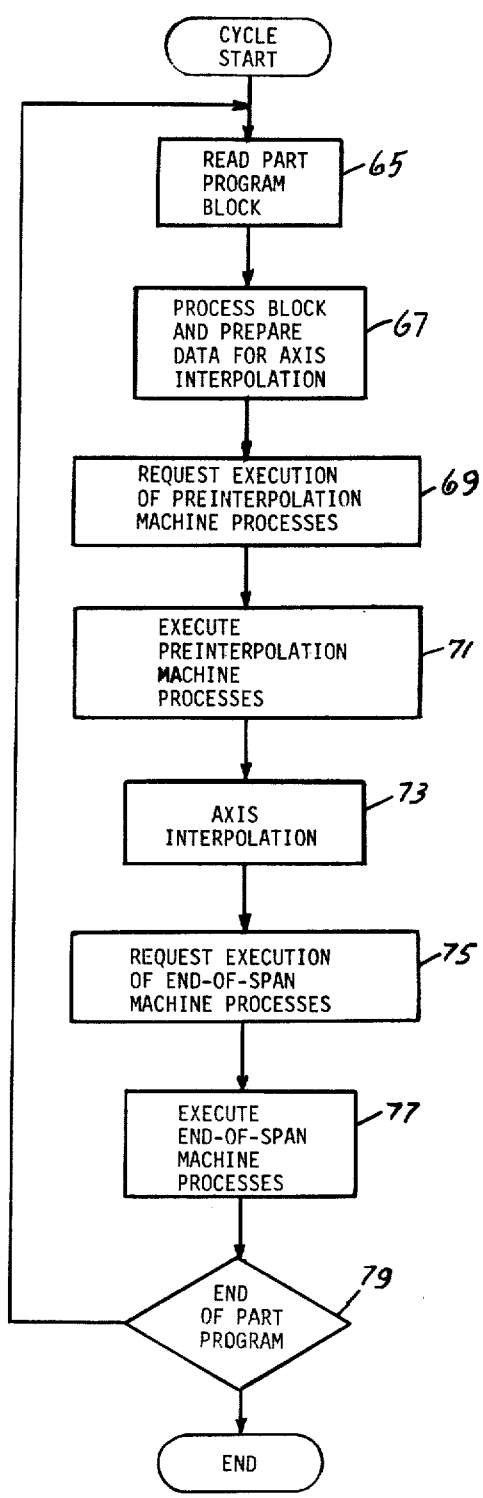
FIG. 2 is a flow chart illustrating the process steps for executing a general machine cycle of operation.

FIG. 2 is a flow chart of a general machine cycle and reflects the interaction of components of the block diagram of FIG. 1 during the execution of a block of part program information. Process step 65 requires a transfer of a part program block of information into the control from an input device. Assuming that the control is in a numerical control mode of operation as opposed to a manual or manual data input mode of operation, the machine cycle is initiated when the operator depresses the cycle start pushbutton. Referring back to FIG. 1, in response to the receipt of an input signal from the cycle start pushbutton, the machine cycle control program 56 directs that a block of part program data be transferred from one of the program input devices 24 and 26. Punch paper tape readers and flexible disc drives are typical of the types of program input devices commonly used with computer numerical control systems. The current active input device is identified by the part program read/display control program 54 which in turn selects the appropriate input device operate program from the set of programs 60. Part program data is then transferred from the active input device to the buffer storage area associated with the NC block processor programs 62.

Process step 67 of FIG. 2 requires that the block of information be processed. The NC block processor programs 62 of FIG. 1 perform data error checks and convert the data from the code in which it is received from the input device to binary. The machine cycle program 56 then directs that the data preparation program 64 separate the machine slide data from the machine mechanism data and calculate the incremental displacements of the machine slides. The machine cycle control program 56 directs that the output control program 66 be used to separate the axis interpolation data from such mechanism operation data as spindle speed, tool number and miscellaneous function commands. The output control program then transfers span length and feed rate data to the axis servocontrol 30 located in the machine interface rack 52.

Process step 69 of FIG. 2 initiates the execution of those machine processes which must occur prior to moving the machine slides, e.g. turning on the spindle and coolant and accelerating the spindle to the programmed speed. The output control program 66 of FIG. 1 initiates a machine process by transferring control of the computer to the mechanism controller 55. The CNC operating system effects control transfer by requesting that the mechanism controller system execute the process queuing program 70. The effect of the control transfer is to inhibit the start of axis interpolation and permit the mechanism controller system to execute the requested pre-interpolation machine processes as indicated in step 71 of FIG. 2.

The queuing program 70 stores process identifier signals representing data identifying processes in either a buffer store called a queue or an active process table 84. The active process table 84 can accept up to 12 entries corresponding to the 12 possible process levels. If the active process table has an entry level available corresponding to the level of the requested machine process, the queuing program will load the requested process identifier signal therein. Further, a block identifier signal representing the first elementary instruction block of the requested process will be entered in the corresponding level of an instruction block pointer table 86. A dwell signal representing a predetermined minimum dwell time will be entered in the corresponding level of a dwell table 80, and an entry is made in the corresponding level of the return instruction table 82 which will direct the continuation of the process upon the expiration of the dwell period.

If the level in active process table 84 corresponding to the level of the requested machine process is being utilized, the queuing program 70 will store the process identifier signal in the queue. Although the queue will accept up to 12 entries, the entries are not dedicated to particular process levels as with the other tables.

After all of the requested preinterpolation process identifier signals have been processed, control is returned to the CNC operating system. Thereafter, one of the system timers 68 responsive to a real time clock in the central processing unit interrupts the execution of programs under control of the CNC operating system and requests that the mechanism controller system begin execution of the process timer program 78. The process timer program 78 utilizes the constant period interrupts generated by the system timers to measure timed intervals corresponding to the dwell signals stored in the dwell table 80. With each interrupt, the entries in the dwell table are sequentially checked to detect the expiration of a delay period. When a delay period expires, the process timer 78 causes the initiation of a program identified by the instructions represented by the signals stored in the return instruction table 82.

Upon completion of execution of the process timer program 78, the machanism controller will proceed to execute a process activating program 72. As the execution of machine processes is completed, entries in the active process table 84 will be cleared; and the process activating program 72 causes process identifier signals to be transferred from the queue to the active process table 84. With the transfer of each process identifier signal, entries are made at the corresponding levels of the instruction block pointer table 86, the dwell table 80 and the return instruction table 82 as earlier described.

When the process activating program 72 has made entries in the tables 80 through 86 for the machine processes stored in the queue, execution of an elementary instruction block is begun under control of the process execute control program 85. The process execute control program recalls signals from memory representing the data for the elementary instruction blocks and initiates the execution of one of the three control programs 88 through 92 depending on the type of elementary instruction block. For example, if the elementary instruction block is a mechanism function block, then the execution of the mechanism function control program 88 is initiated. The process execution control program performs the machine functions called for by the elementary instruction blocks by executing either a sensing device operate program 94 or an actuating device operating program 96. These programs are tailored for exchanging data between the computer and the machine device interfaces located in the machine device interface rack 52. An elementary instruction block may also define an auxiliary function which will require the execution of the auxiliary function control program 90. As a third alternative, the elementary instruction block may require the execution of the process inhibit control program 92. The process execution control program continues to recall elementary instruction blocks for the active processes until it has completed the execution of all elementary instruction blocks of all of the preinterpolation processes.

The process execution program then causes the mechanism controller system to generate a start of span NC cycle release signal which allows the CNC operating system to permit axis interpolation as defined in process step 73 of FIG. 2. When an end of span is achieved, process step 75 requires that the output control program 66 again initiate the execution of machine processes. The particular processes to be executed after interpolation may include such functions as stopping the spindle, turning off coolant and changing tools. Control is transferred from the CNC operating system to the mechanism controller system which proceeds to execute these processes as provided in process step 77. The CNC operating system is prohibited from continuing with the automatic machine cycle until the mechanism controller generates an end of span NC cycle release signal. As provided in process step 79, if the part program is not finished; the final NC cycle release will initiate the transfer of another part program block and the execution of another machine cycle. The process of FIG. 2 continues until the end of a part program.

Figure 3A:
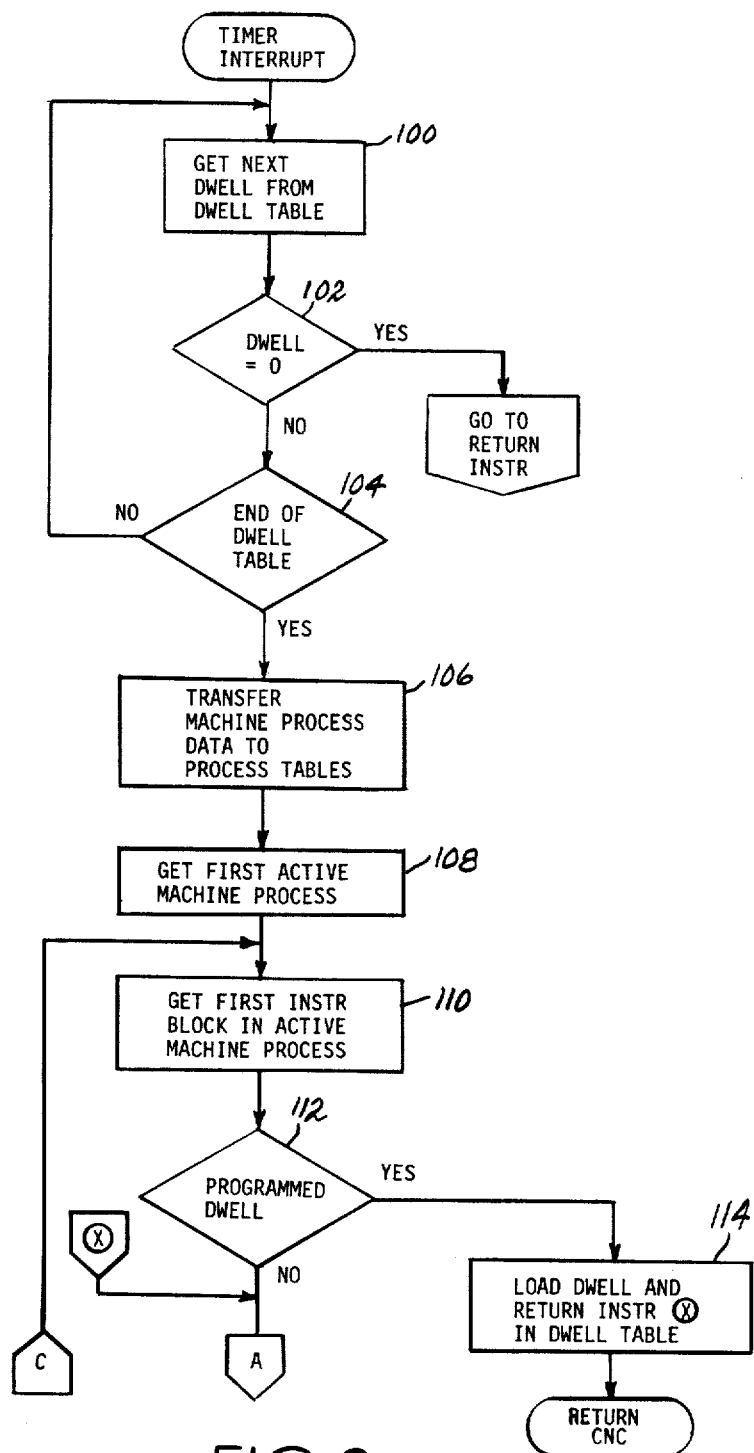
FIGS. 3a and 3b are a general flow chart depicting the capability of the mechanism controller of executing multiple machine processes.
Figure 3B:
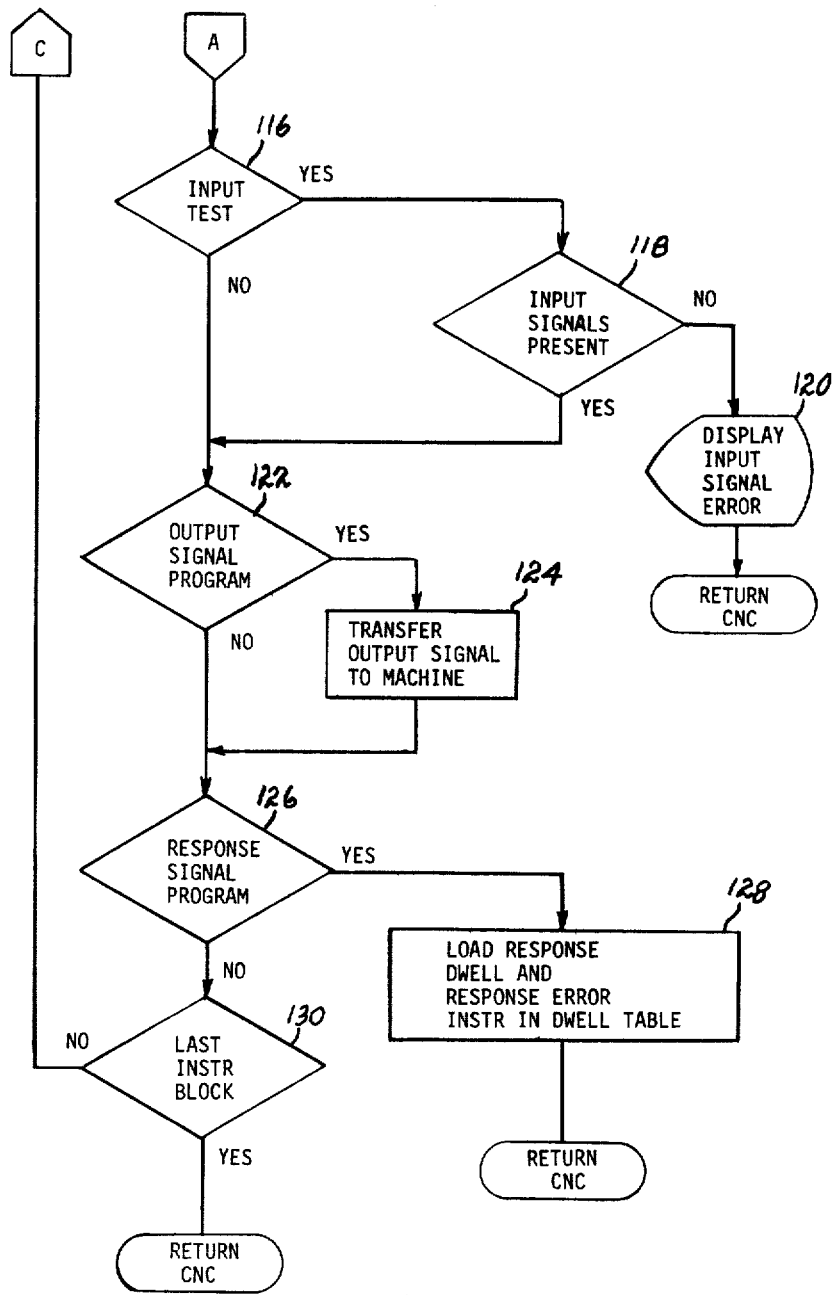

FIGS. 3a and 3b are a general flow chart depicting the capability of executing multiple processes under control of the mechanism controller system. Assuming that a process request has been queued, process execution begins with the interruption of the operation of the CNC operating system by one of the system timers 68 which requests transfer of control to the process timer program 78. As represented by process steps 100, 102, and 104 of FIG. 3a, this program tests for the presence of expired delay periods by examining the signals in the dwell table 80. In the event that none of the delay periods have expired, the process timer program initiates the execution of the process activating program 72.

As indicated step 106 of FIG. 3a, in response to the presence of process requests in the queue, the process activating program stores process identifier signals in the appropriate tables for each of the queued processes. In particular, an entry is made in the active process table 84, the instruction block pointer table 86, the return instruction table 82 and the dwell table 80; while at the same time, the entry in the queue for the process being activated is cleared.

For the sake of generality, it is assumed that the elementary instruction blocks comprising the active processes are mechanism functions. Consequently, the process execution program begins execution of the mechanism function control program. Referring to FIG. 3a, process steps 108 and 110 recall the first elementary instruction block associated with the first active process. Decision step 112 determines the presence within the elementary instruction block data of a programmed dwell. In the event that there is a programmed dwell, process step 114 causes the dwell time value to be loaded into the dwell table at the appropriate process level. Execution of that process is suspended, and process control is returned to the CNC operating system. During the delay period of the programmed dwell and in response to a subsequent system timer interrupt, the process execution control program will permit the execution of elementary instruction blocks of other active processes. The execution of the other machine processes may likewise be suspended if there are programmed dwells present within the elementary instruction blocks of those processes.

Upon the expiration of the programmed dwell delay period or in the event no program dwell was present within an elementary instruction block, the machine process resumes with process step 116 to determine the presence of an input signal test. The input signal test of process step 118 is used to compare a first set of signals representing the actual conditions of a logical combination of as many as six input signals to a second set of signals representing expected programmed states. If there is a difference between the actual states and the expected states, the mechanism function control program will cause the generation of an error signal via process step 120. Provided that the mechanism function control program determines either an absence of an input signal test or that the actual input signal conditions concur with the expected states, process step 122 tests the elementary instruction block for the presence of an output signal. The elementary instruction block permits the machine builder to program up to four output signal states thereby allowing process step 124 to turn ON two or turn OFF two machine devices. The mechanism function control program then determines the presence of a programmed response signal in process step 126 to monitor the condition of the machine device affected by the output signals. The machine builder also programs a response time as part of the elementary instruction block, and the mechanism function control program loads the value representing this response time in the dwell table as indicated in process step 126. This dwell table entry agains suspends execution of the process pending the expiration of the delay period; or in this case, pending the receipt by the mechanism control system of a response signal indicating the occurrence of the expected condition of the machine device. As before, process control is returned to the CNC operating system; and during the period of suspension of execution of this process and in response to a subsequent interrupt, the process execution control program permits the execution of elementary instruction blocks of other active processes. If the expected response signal is not received prior to the expiration of the response delay period, the mechanism function control program then generates an error signal.

In the absence of a programmed output or a programmed response, operation is returned to the control of the process execution control program which then makes a determination via process step 130 as to whether the elementary instruction block just completed was the last elementary instruction block of that active process. If there are remaining elementary instruction blocks for that process, then execution of the process is continued by recalling the next elementary instruction block from the instruction block data store 76. If the elementary instruction block just completed is the last elementary instruction block of that active process, process control is returned to the CNC operating system. The process of FIGS. 3a and 3b is iterated in response to subsequent interrupts until all the requested processes have been executed. Thereafter, the process execute control program generates an NC cycle release signal to return control to the CNC operating system.

Figure 4:
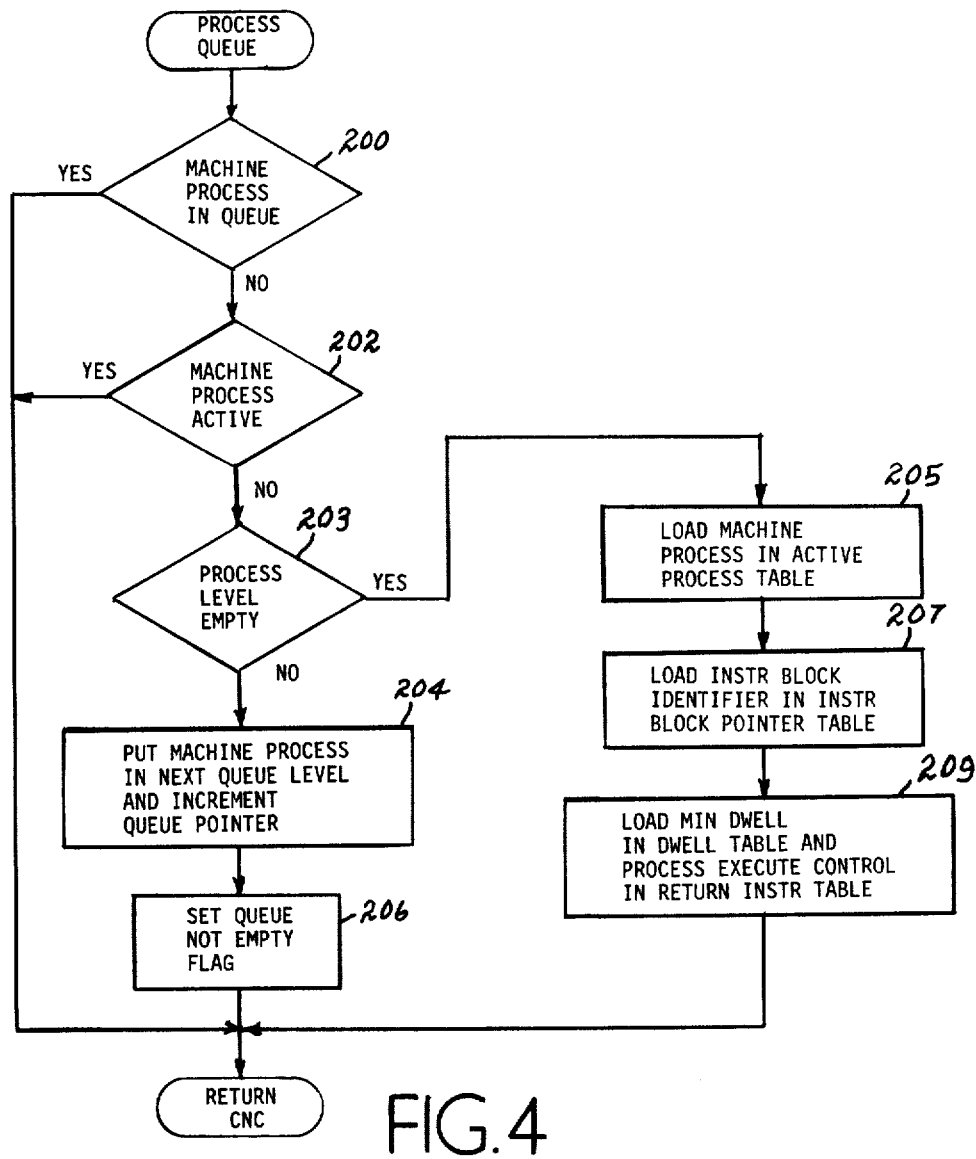
FIG. 4 is a flow chart illustrating the process steps for executing the process queuing program 70.

FIG. 4 is a flow chart illustrating the steps of the process queuing program 70. As described above, a machine process request may arise from the execution of a part program or the exercise of pushbuttons and switches on the numerical control. In either case, the CNC will transfer control to the mechanism controller so that a process identifier signal identifying the machine process may be recognized by the mechanism controller.

Upon generation of a particular process identifier signal, process step 200 determines whether the same process identifier signal is already in the queue. If it is, control is returned to the numerical control. If the process identifier signal is not in the quene, decision step 202 determines whether the requested machine process is currently running, i.e. is the process identifier signal in the active process table? If the process is currently active, control is returned to the numerical control. If the requested machine process is not currently running, process step 203 determines whether the corresponding process level of the active process table is available. If another machine process currently occupies the desired level of the active process table, process step 204 places the process identifier signal in the next available queue level; and process step 206 sets a quene-not-empty flag. If decision step 203 determines that the desired process level in the active process table is available, process step 205 will cause the process identifier signal to be loaded into the available level of the active process table 84. In process step 207, the first block identifier signal identifying the first elementary instruction block associated with the new machine process is loaded into the corresponding level of the block instruction pointer table 86. In process step 209, a dwell signal representing a system minimum dwell time is loaded into the corresponding level of the dwell table 80; and an instruction for initiating the execution of the first instruction block is loaded into the return instruction table at the same level. After the requested machine process is either loaded into the active process table or the queue, process control is returned to the CNC operating system.

Figure 5:
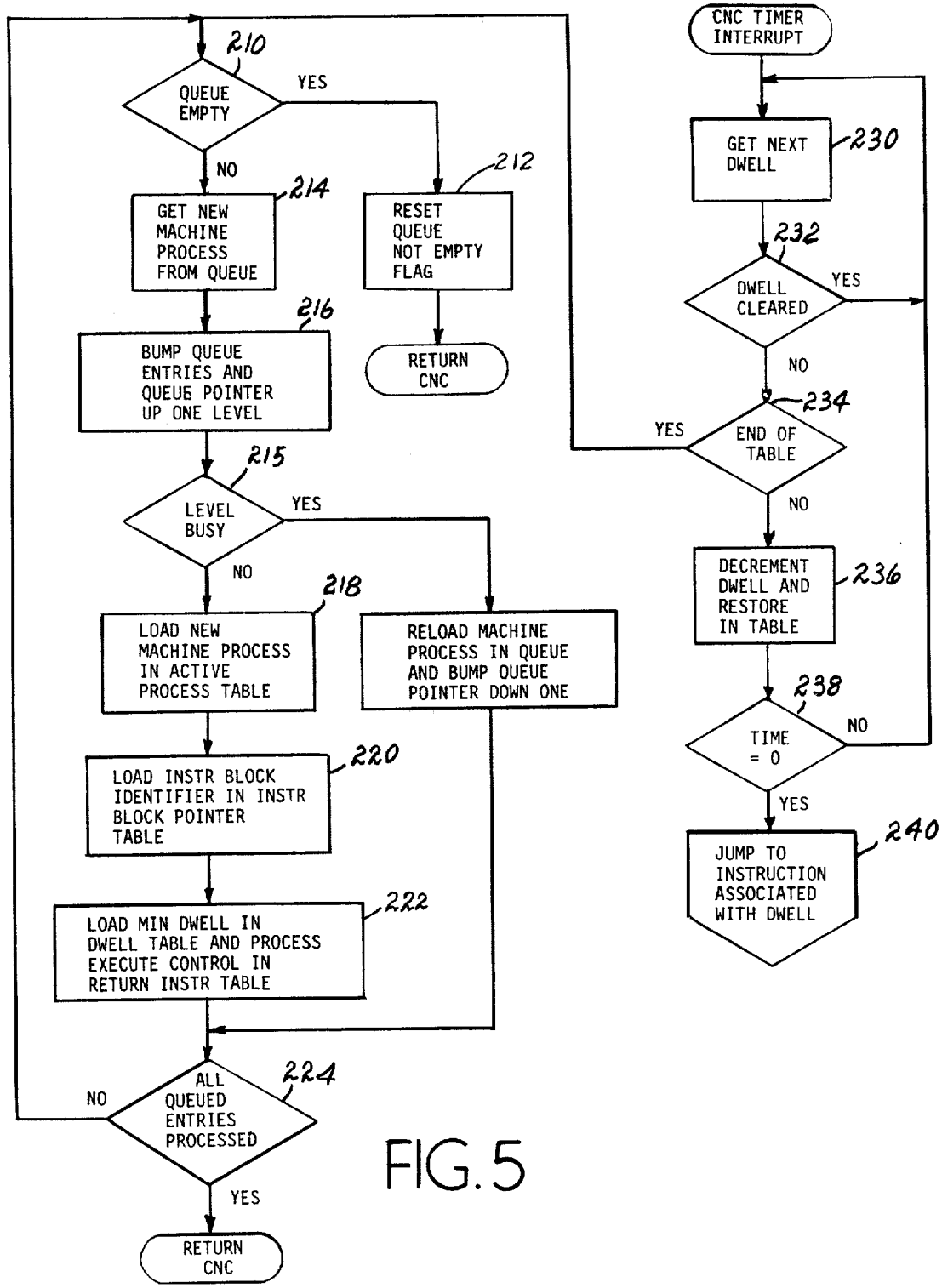
FIG. 5 is a flow chart illustrating the process steps for executing the process activating program 72 and the process timer program 78.

FIG. 5 is a flow chart illustrating the steps of the process activating routine 72 and the process timer routine 78. With each timer interrupt from the system timer 68 of the numerical control, two functionally independent processes are executed. First, the process timer in the mechanism controller updates the dwell times; and second, the requested machine processes in the queue are serviced. Although the process timer is run first with each interrupt, the queue servicing process will be described first.

Decision block 210 determines whether the queue is empty. If the queue is empty, process step 212 resets the queue-not-empty flag after which process control is returned to the numerical control. If the queue is not empty, process step 214 retrieves a new process identifier signal from the queue. After which, process step 216 requires that the queue entries and the queue pointer be moved up one level. Process block 215 determines whether the active process table contains an active machine process of the same level as the new machine process. Only one process of a particular level can be active at one time. Therefore, if the level of the new machine process is busy, process step 217 will increment the queue pointer down one level and return the new process identifier signal to the bottom of the queue. The process will move through steps 224 and 210, and the next entry in the queue table will be read by process step 214. The first process identifier signal process will not be examined again until the next timer interrupt.

If step 215 determines the process level is not busy, in process step 218, the new process identifier signal is loaded into an available level of the active process table 84. In process step 220, the first block identifier signal identifying the first elementary instruction block associated with the new machine process is loaded into the appropriate level of the block instruction pointer table. In process step 222, a dwell signal representing a system minimum dwell time is loaded into the same level of the dwell table. Process step 222 also requires that an instruction for initiating the execution of the first instruction block be loaded into the corresponding level of the return instruction table. Next, decision block 224 determines whether all the queue entries have been processed. If not, the process returns to decision block 210; and the process defined by steps 210 through 224 is iterated until all of the queued machine processes have been serviced. At this time, the process control is returned to the computer numerical control via decision block 224.

Turning to the operation of the process timer which occurs before the servicing of a queue in response to a timer interrupt, process block 230 retrieves the first entry from the dwell table. Decision block 232 determines whether a dwell signal in fact exists. As will be described later, after being loaded into the dwell table, conditions may require that the dwell signal be cleared prior to its expiration. If in fact the dwell signal has been cleared, the process iterates again through process step 230 to obtain the next dwell signal from the table. Process step 234 is used to detect the end of the dwell table. If the next dwell signal has not been cleared and does not define the end of the dwell table, the dwell signal magnitude is decremented an amount equal to the period between the timer interrupts from the numerical control; and the new value is stored back in the original location in the dwell table. Process step 238 determines whether the new dwell signal value is equal to zero. If it is not equal to zero, the process returns to step 230 to retrieve a further dwell signal from the table. If the new dwell signal magnitude is zero, the dwell time has expired; and process step 240 requires that the process jump to the instruction contained in the return instruction table which is associated with the expired dwell time.

For example, consider the situation in which process step 222 has loaded the minimum dwell time into the dwell table and also loaded an instruction to execute the first elementary instruction block in the return table. On the next interrupt from the CNC, if the process timer iterates to the dwell table level containing the minimum dwell time, process step 236 will decrement that time to zero; and process step 240 will cause the process to jump to the instruction requiring the execution of the first machine function defined by the first elementary instruction block. As will be appreciated by those who are skilled in the art, the process described by steps 230 through 240 and steps 210 through 224 are functionally independent. In the preferred embodiment, these two processes are executed in response to a single timer interrupt; however, these processes may also be executed independently in response to two separate interrupt signals.

Figure 6:
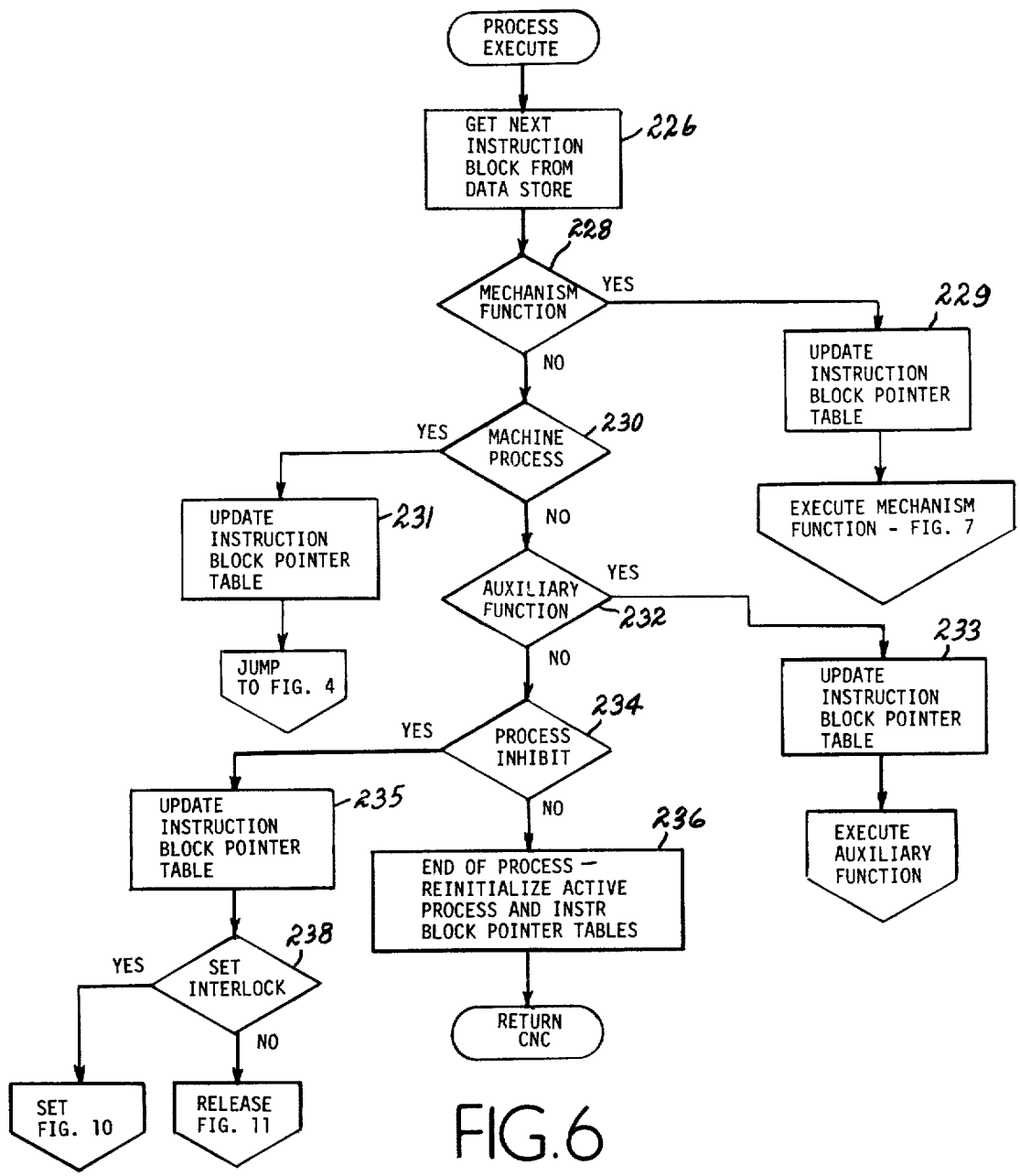
FIG. 6 is a flow chart illustrating the process steps for executing the process execute control program 85.

FIG. 6 is a flow chart of the process execute control program 85 and illustrates the steps for executing a machine function. Process step 226 requires that the elementary instruction block data representing the next machine function be recalled from the instruction block data store 76. The proper elementary instruction block may be located in the instruction block data store by utilizing the process identifier signal stored in the active process table and the block identifier signal stored in the instruction block pointer table. As has been discussed earlier, there are four possible varieties of machine function which are identified by four different types of elementary instruction blocks. In process blocks 228, 230, 232 and 234, a determination is made to identify which type of machine function exists. Decision block 228 detects if the elementary instruction block defines a mechanism function. A mechanism function generally requires the actuation of some device on the machine in response to the predetermined set of machine conditions.

If the elementary instruction block identifies a mechanism function, process step 229 updates the instruction block pointer table by loading therein a new block identifier signal identifying the next elementary instruction block in the active process. The process then jumps to FIG. 7 which describes the execution of a mechanism function. Process step 230 checks to see if the next elementary instruction block represents a request for another machine process. In other words, with the disclosed system, one machine process may require the execution of one of more other machine processes. In this case, after process step 231 updates the instruction block pointer table, decision step 230 will carry process control back to the process queuing routine defined in FIG. 4 thereby causing the process identifier signal defined by the elementary instruction block to be loaded in the queue.

Decision block 232 determines whether the elementary instruction block defines an auxiliary function. Generally, auxiliary functions are specially defined functions which are utilized within the control itself. Usually, these functions do not require the actuation of a particular device on the machine. These functions may also be used to handle special arithmetic or logical operations. If the elementary instruction block represents an auxiliary function, process step 235 updates the instruction block pointer table; and decision step 232 will cause the process to jump to a subroutine associated with the particular auxiliary function identified. Since there may be a large number of auxiliary functions, each of which represents a special activity, no flow chart of the general operation of an auxiliary function is shown. The instruction block data store 76 of FIG. 1 contains a library of routines defining the various auxiliary functions. In an example to follow, certain specific auxiliary functions will be disclosed in detail.

Finally, process steps 234 determines whether the elementary instruction block represents a process inhibit. This will cause a current process to be interrupted in its operation until the completion of some other active process. In the case of a process inhibit, process step 233 updates the instruction block pointer table; and process step 234 via decision block 238 will carry process control to the appropriate one of FIG. 10 or 11. If the entry in the instruction block pointer table does not define any of the above, then process step 236 identifies the entry as an end of machine process code and causes the active process table and function tables to be reinitialized.

Figure 7:
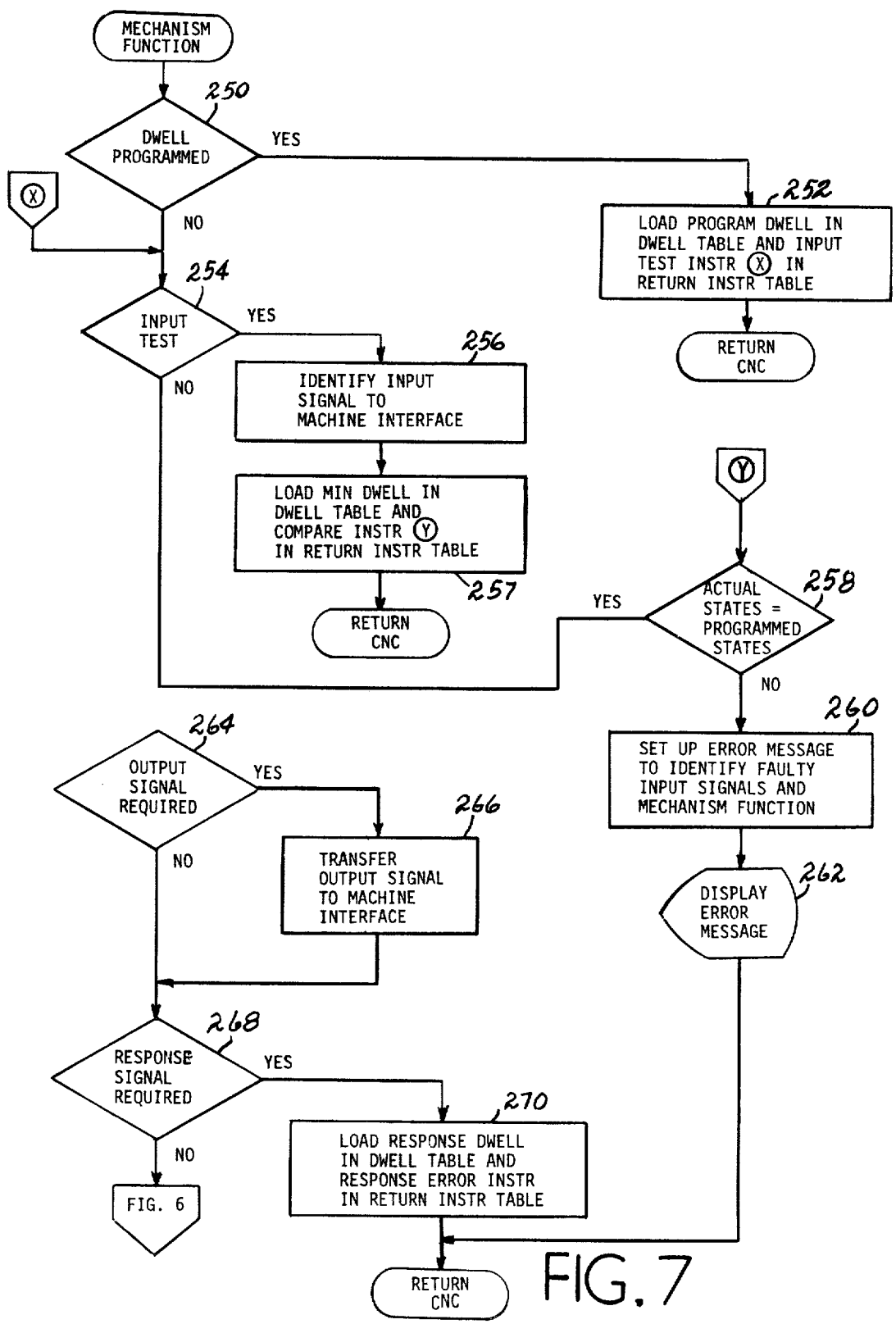
FIG. 7 is a flow chart illustrating the process steps for executing the mechanism function control program 88.

FIG. 7 is a flow chart of the mechanism function control program 88 and illustrates the steps required to execute an elementary instruction block associated with a mechanism function. In many situations, the machine builder may wish to delay the execution of a particular mechanism function for some predetermined period of time. In this situation, he programs the desired dwell as part of the elementary instruction block. Process step 250 determines whether such a dwell has been programmed. If so, the programmed dwell signal is loaded into the dwell table, and an input test instruction is loaded into a corresponding level of the return instruction table via process step 252. At this point, the process is returned to the computer numerical control. Processing of this elementary instruction block is inhibited for a period of time represented by the programmed dwell. As described in FIG. 5, when the dwell expires, the input test instruction in the return instruction table will cause the process to jump to decision step 254. The same point in the process is also reached if decision step 250 detects that no dwell has been programmed in the elementary instruction block.

Decision step 254 determines whether an input signal test is required. Many times the machine builder will only want to actuate a device on a machine if in fact certain other machine conditions exist. These other machine conditions can be defined by the machine builder as a logical combination of input signals within the elementary instruction block.

If such a test is required, it is necessary to interrogate the machine interface to determine the states of the particular inputs. With some machine interfaces, the states of the input signals may be read directly via process step 256 and then compared in process step 258. Other machine interfaces require some settling time period before the input signal states may be read. With these interfaces, process step 256 identifies to the machine interface the input signals to be tested. Process step 257 loads a dwell signal representing the minimum system dwell in the dwell table and a compare input instruction in the return instruction table, and thereafter, process control is returned to the CNC operating system. During the next interrupt, the process timer will decrement the dwell signal to zero, and the states of the input signals will be available for the comparison process in the decision step 258. In process step 258, the actual set of states of the input signals is compared to the programmed set of states of the input signals. If the actual and programmed states do not correspond, process step 260 will generate an error message identifying the current mechanism function as well as the input signals which are in error. This message is then displayed by process step 262. However, if the actual and programmed states of the input signals do agree, decision block 264 determines whether an output signal is required.

Not only may an input signal test be used to determine a particular machine condition at some point in time in the machine cycle, but the input signal test may also be used to establish a condition precedent for the production of an output signal to the machine. The elementary instruction block is capable of defining up to two output signals to turn ON or two outputs signals to turn OFF four machine devices. If decision step 264 determines that an output signal has been programmed, process step 266 will cause the programmed output signal states to be transferred to the machine thereby controlling devices on the machine to execute a particular function.

Process step 268 determines whether a response signal has been programmed within the elementary instruction block. If no response signal has been programmed, the process returns to FIG. 6 to execute the next elementary instruction block. However, in most situations, it may be advantageous to test whether or not the output signal has in fact generated the desired function. To make this test, a signal is chosen the state of which is changed by the execution of that function. This signal is defined as a response signal and programmed in the elementary instruction block. Obviously, the result of the execution of a machine function will not occur on an instantaneous basis. Therefore, a response dwell must also be chosen which represents a reasonable time within which the machine function can occur. Process step 270 causes the response dwell signal to be loaded in the dwell table, and a response error instruction to be loaded in the return instruction table.

Figure 8:
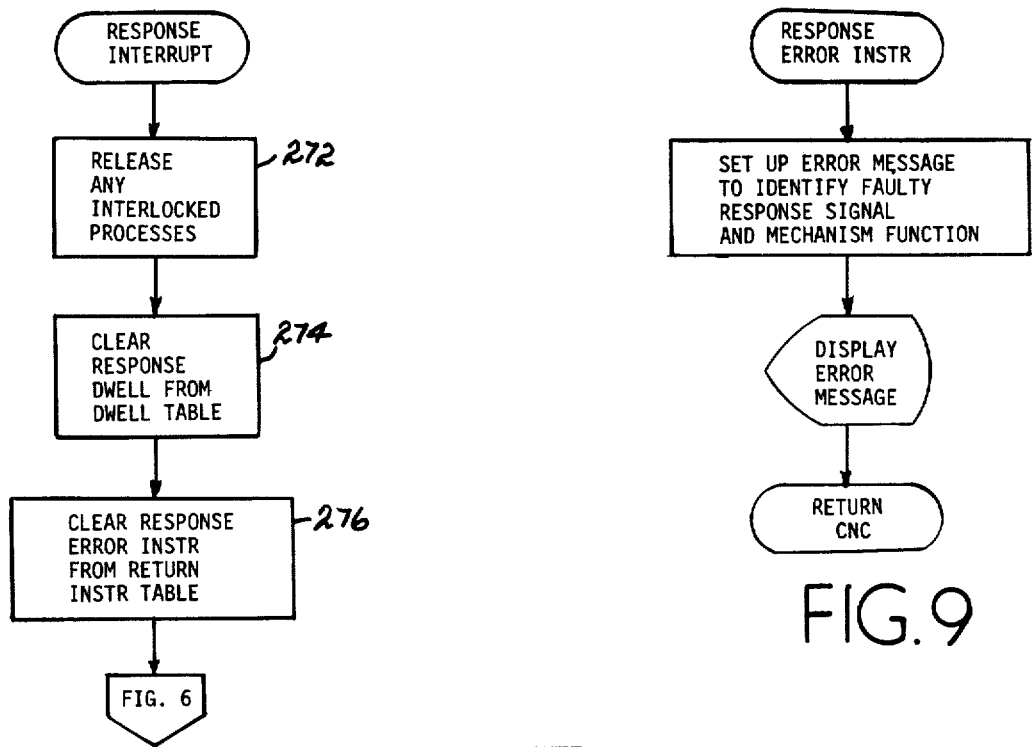
FIG. 8 is a flow chart illustrating the process steps which are executed in response to a response signal interrupt.
Figure 9:
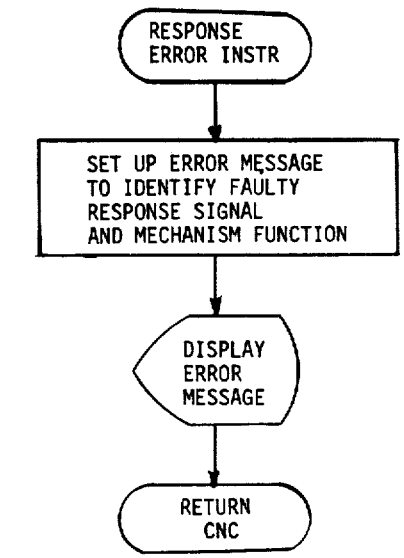
FIG. 9 is a flow chart illustrating the process steps which are executed to produce a response signal error display.

If the required function occurs within the response dwell, the change of state of the response signal will cause an interrupt to occur and initiate the process illustrated in FIG. 8. In process step 272, the response signal interrupt will first release any interlocked processes. The meaning of the step will be made clearer in the discussion relating to process inhibits. Process step 274 operates to clear the response dwell time from the dwell table, and process step 276 clears the response error instruction from the return instruction table. The occurrence of the response signal indicates that a machine function has been properly executed; therefore, after the dwell and return instruction tables have been cleared, the process returns to the beginning of FIG. 6 to recall the next elementary instruction block in the active machine process. If, however, the response signal does not occur within the response dwell, upon the process timer detecting the expiration of the response dwell, the process jumps to the response error instruction illustrated in FIG. 9. Process step 278 will generate an error message to identify the current mechanism function and its associated faulty response signal, and process step 280 will cause this error message to be displayed. Process control is then returned to the computer numerical control.

Figure 10:
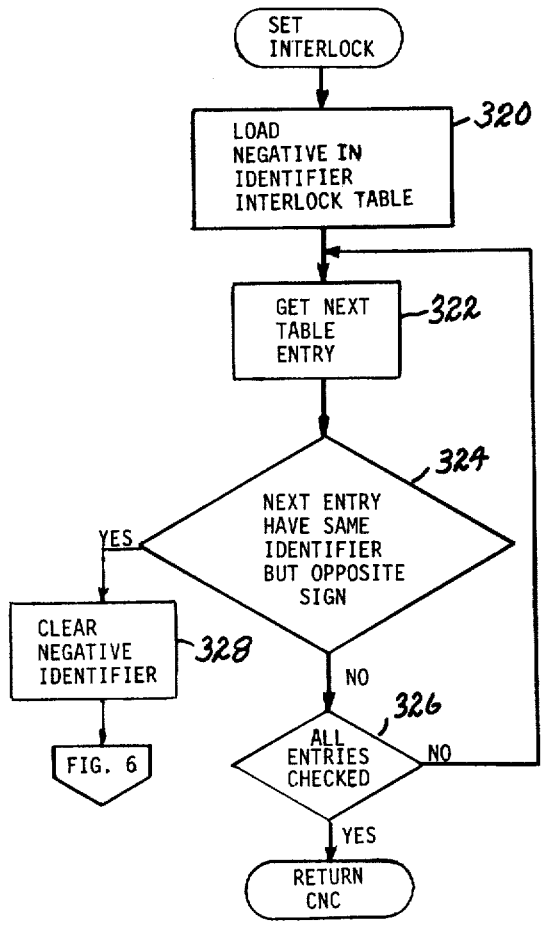
FIG. 10 is a flow chart illustrating the process steps which are required to set a process interlock.

FIG. 10 is a flow chart of the part of the process inhibit control 92 which suspends process execution by the use of process inhibit elementary instruction blocks. A process inhibit is intended to effect an interlock between associated processes, e.g. the suspension of a tool changing process until the completion of a spindle stopping process. The machine builder sets a process inhibit by utilizing an elementary instruction block comprised of a special process inhibit character tagged with an arbitrary negative identifier. The process containing the inhibit character and negative identifier will be suspended until another process executes an elementary instruction block comprised of the inhibit character tagged with a corresponding positive identifier. The process suspension procedure is initiated when the process execution control program recalls an elementary instruction block which defines a process inhibit. Process step 234 of FIG. 6 detects the process inhibit, and process step 238 detects the negative identifier and transfers process control to the process illustrated in FIG. 10.

In process step 320, the negative identifier signal is entered into the appropriate process level of an interlock table. The interlock table will accept as many entries as there are process levels. In process steps 322, 324 and 326, each entry of the interlock table is compared to the newly entered negative identifier signal. The process inhibit is released by an entry in the interlock table having the same identifier but the opposite or positive sign. If such an entry is not identified, the process remains suspended; and process control is returned to the CNC operating system. If a corresponding identifier signal having an opposite sign is in the table, process step 328 clears the negative identifier signal; and process control is transferred back to the process execution control program of FIG. 6.

Figure 11:
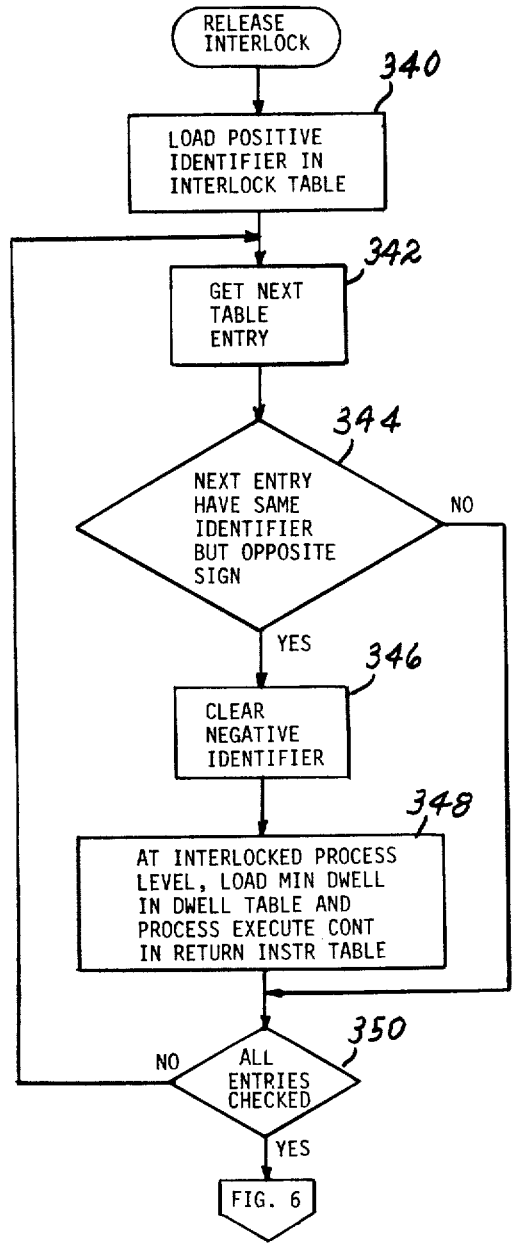
FIG. 11 is a flow chart illustrating the process steps which are required to release a process interlock.

FIG. 11 is a flow chart illustrating the steps for releasing an inhibited process. In response to process step 238 of FIG. 6 detecting a process release, i.e. an elementary instruction block comprised of the process inhibit character tagged with a corresponding positive identifier, process step 340 enters the positive identifier signal in the appropriate process level of the interlock table. Process steps 342 and 344 test each entry in the interlock table to detect the same identifier having an opposite or negative sign. If the interlock table contains an identical identifier signal with an opposite sign, process step 346 will clear the negative identifier signal from the interlock table, and process step 348 operates to release the inhibited process. This is accomplished by loading a minimum dwell signal into a location in the dwell table corresponding to the process level of the inhibited process. In addition, a process execute control instruction is loaded into the return instruction table at the same process level. Consequently, during the next interrupt time, the process timer will detect the expiration of the minimum dwell time; and process control will be transferred to the process execution control program of FIG. 6 which will execute the next elementary instruction block, thereby causing the inhibited process to be restarted. After all the entries of the interlock table have been tested via process step 350, process control is returned to the process execution control program of FIG. 6.

As described earlier, the machine builder has the capability of programming any desired machine cycle of operation. The machine cycle is designed by defining a number of independent machine processes that are individually selected by the numerical control. Each machine process is comprised of a serial string of machine functions which may be of the four different types described earlier. Typically, a machine cycle of operation would be expressed as a ladder diagram which diagrammatically illustrates rows of contacts which actuate a coil or machine device to execute a function. This type of illustration is typically carried over into programmable controllers in which the contacts only represent logic states within the controller. In contrast, in utilizing the present invention, the desired processes are expressed as the flow charts. By way of example, a simple machine process will be described. In order to change tools, an initial process of searching for the new tool must be executed.

Figure 12:
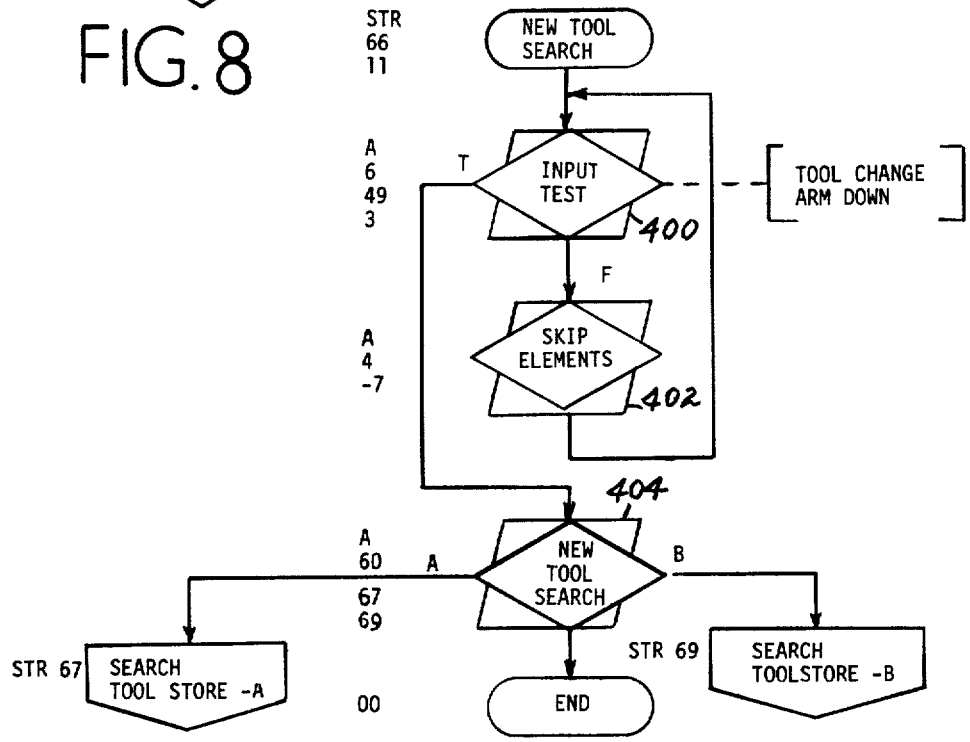
FIG. 12 is a flow chart illustrating the machine tool builder logic that is required to initiate a new tool search process.

FIG. 12 is a flow chart illustrating the initial steps for beginning a new tool search. Process step 400 tests to determine if the tool change arm is in its proper position. This position may be indicated by a limit switch or other device. If the arm is not in its correct position, process step 402 will cause the process to iterate around the testing step 400 until the arm is properly located. When in position, the process moves to step 404 which determines in which of a number of tool stores the new tool is located. The result of this determination eill initiate another machine process to carry out the tool search operation. This flow chart is comprised of three auxiliary functions which have been predefined as being particularly useful in defining machine cycles of operation. For any particular machine type, the list of auxiliary functions may be relatively fixed. However, the list will change substantially with each different type of machine. The result of the process step 404 will be to select one of two other further machine processes—either a search of tool store A or a search of tool store B. Assume process step 404 determines the new tool is located in tool store A.

Figure 13:
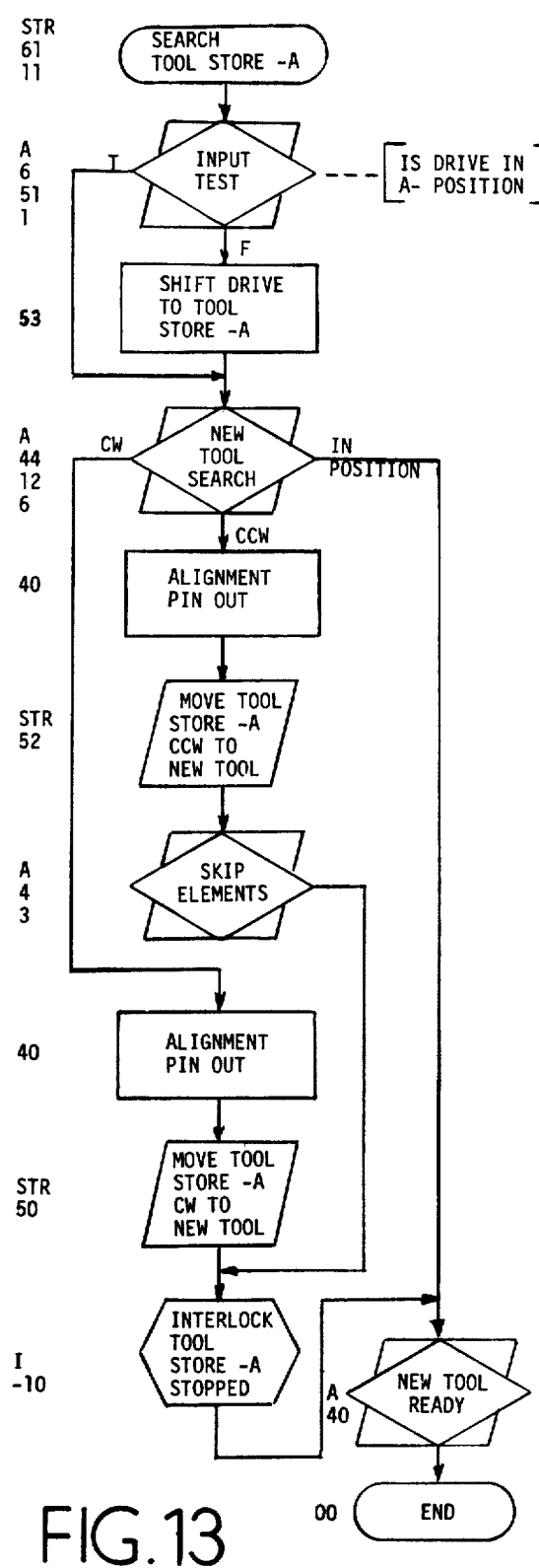
FIG. 13 is a flow chart illustrating the machine tool builder logic defining the process steps of searcing a tool store.

FIG. 13 is a flow chart illustrating the steps of searching tool store A. Process steps 410 and 412 insure that the chain drive for rotating the tool stores is in fact connected to tool store A. Process step 414 determines in which direction to move the tool store to reach the desired tool in the shortest path. If the tool store is to move clockwise process steps 422 and 424 operate the tool store in a clockwise direction until the desired tool is positioned in alignment with the tool change arm. Similarly, if the tool store is to move counterclockwise, process steps 416, 418 and 420 cause the tool store to move in a counterclockwise direction until the desired tool is properly located. Process step 426 inhibits further operation of the process in FIG. 13 until the tool store motion is terminated, and process step 428 enables the actual transfer of the tool from the tool store. If process step 404 of FIG. 12 determined that the new tool was located in tool store B, a process similar to that illustrated in FIG. 13 would be executed; however, all references to tool store A would be changed to tool store B.

Assume in FIG. 13, process step 424 is selected to move the tool store clockwise. This process is illustrated in detail in FIG. 14. First, process step 430 checks to see if an access door covering the tool change mechanism is closed. If the door is not closed, the tool store drive is inhibited. If the door is closed, process steps 436, 438 and 440 operate to increment the tool store one tool location at a time until the desired new tool location is reached. When the new tool location is reached, process step 444 inserts an alignment pin which locks the tool store location in alignment with the tool change arm. Process step 446 releases the process illustrated in FIG. 13, and process step 448 turns off the chain drive to tool store A.

It is apparent that the above flow charts are more than general expressions of a search process for a new tool. They define processes comprised of elements which are unique to the invention, e.g. auxiliary functions, process inhibits, mechanism functions. These functions are stored as subroutines in the instruction block data store 76 and are individually addressed with a unique auxiliary function number. To reduce the flow chart to a machine cycle program, the machine builder must define an elementary instruction block for each function in the process.

For example, FIG. 12 represents a process that may be independently requested and executed by the CNC operating system. The process of FIG. 12 is defined by a process mnemonic, STR, a process number, e.g. 66, and an arbitrary process level number, e.g. 3. Further, FIG. 12 has three auxiliary functions; and therefore, three elementary instruction blocks must be defined. The process is terminated with an end of process code, e.g. 00. The elementary instruction block for an auxiliary function consists of the auxiliary function address A, an auxiliary function number and whatever parameters are necessary to execute the auxiliary function. For example, the test input function has an elementary instruction block which contains the address A, the unique identifying number 6, the address of the input signal to be tested and the number of instructions which are to be skipped if the input test is true.

The other auxilliary functions are defined in a similar manner and therefore, the program for the process of FIG. 12 will appear as follows.

STR 66 3 A 6 49 3 A 4 7 A 60 67 69 00

When the computer numerical control requires a new tool search, it will transfer an S 66 process identifier signal to the mechanism controller. After S 66 is queued and stored in the active process table, each of the alphabetic and numeric instructions is recalled to execute the process. The instruction block pointer table contains a block identifier signal for each active process level which points to the first character of the next elementary instruction block to be processed.

For example, for process step 400 the elementary instruction block A 6 49 3 is selected by an entry in the instruction block pointer table. After reading the first instruction block, the entry in the instruction block pointer table now points to the first character A of the second instruction block A 4 −7. The mechanism controller decodes the A and knows the elementary instruction block is an auxiliary function. Upon decoding the number 6, the controller retrieves an associated auxiliary function subroutine from the instruction block data store 76. This subroutine executes a process as defined by the flow chart in FIG. 15. Process step 460 reads the input number 49 from the elementary instruction block which is the input number assigned to the input signal connected to the tool change arm limit switch. Process step 462 reads the state of the input signal 49. If the input signal has a true state, process step 466 utilizes the last character in the elementary instruction block associated with this auxiliary function to cause entry in the instruction block pointer table to be incremented three characters forward thereby jumping from the A character of auxiliary function A 4 −7 to the A character of auxiliary function A 60 67 69. Consequently, in the program, the elementary instruction block comprised A 4 −7 is skipped.

If the input signal 49 has a false state, the subroutine ends because process step 468 causes the process to ignore the skip character number 3. When the first auxiliary function ends, the process execute control program of FIG. 6 reads the next elementary instruction block A 4 −7 shown in process step 402 of FIG. 12. At this time the instruction block pointer table contains an entry pointing to the first character A of the next instruction block A 60 67 69.

The A identifies the function as an auxiliary function. The number 4 identifies the function as a skip function, and the number −7 means the entry in the instruction block pointer table should be stepped back seven characters in the program returning it to the first character A of auxiliary function A 6 49 3 shown in process step 400 of FIG. 12. Thus, the process iterates until the tool change arm is in position and input signal 49 tests true.

Figures 15, 16:
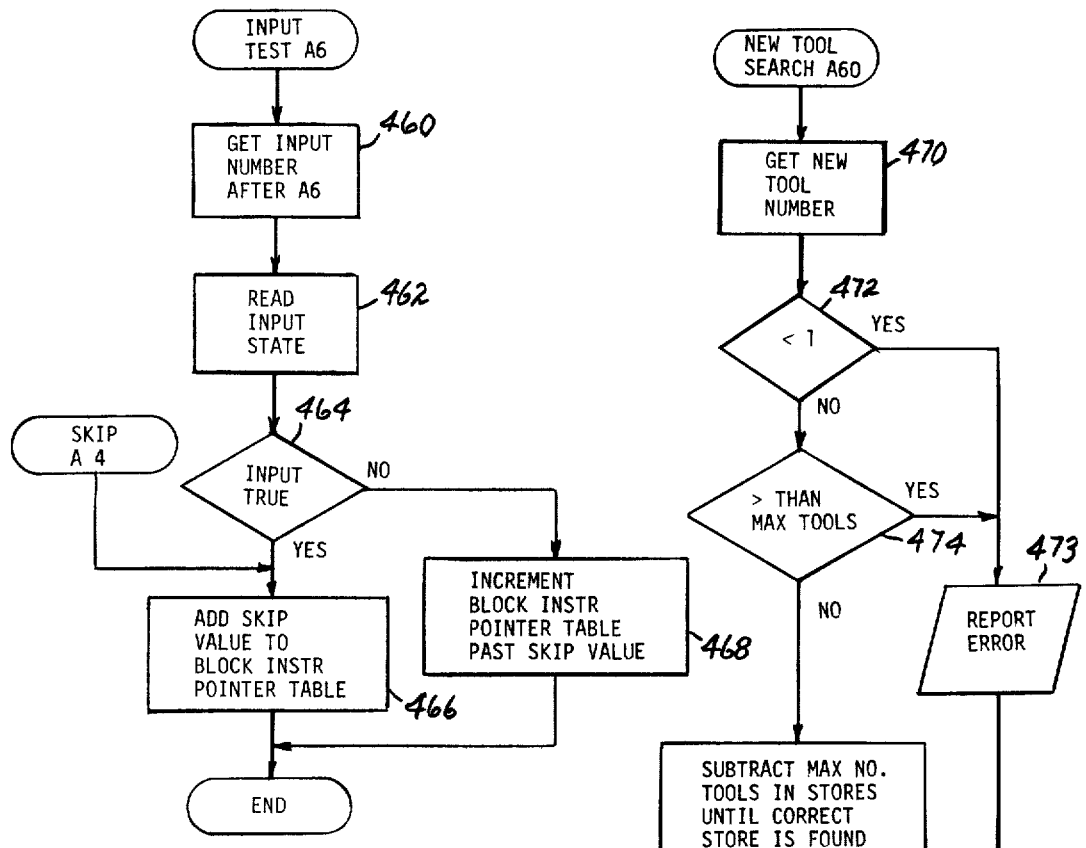
FIG. 15 is a flow chart illustrating the process steps for executing the input test and skip auxiliary functions.
FIG. 16 is a flow chart illustrating the process steps for executing the new tool search auxiliary function.

In the third auxiliary function of this process, the auxiliary function 60 requires the execution of the subroutine shown in FIG. 16 to determine which of several tool stores the new tool is located. In process blocks 470, 472 and 474, the new tool number is recalled and checked for validity. If the new tool number is valid, step 476 determines in which tool store A or B the new tool is located. Assume it is determined the new tool is located in tool store A, step 478 will select process 67 as the next process to be executed; and its process identifier signal will be queued and loaded into the active process table. Note that the two possible processes to be selected were programmed with the auxilliary function 60.

Referring to FIG. 13, process 67 will be defined by the following: STR 67 11 A 6 51 1 53 A 44 12 6 40 S 52 A 4 3 40 S 50 I-10 A 40 00. In starting the process illustrated in FIG. 13, step 410 requires the execution of auxiliary function 6 which tests the state input signal 51 to determine if the drive is connected to the tool store A. If the drive is not connected, the entry in the instruction block pointer table moves the process to the character 53 which is an address of an elementary instruction block for a mechanism function. The contents of mechanism function elementary instruction blocks are stored in the instruction block data store 76 and are recalled upon the appropriate numerical address being read.

The format of an elementary instruction block for a mechanism function is fixed but not all fields of the block must contain information. The exact composition of an elementary instruction block for a mechanism function may vary depending on the requirements and ideas of a particular system designer. The following is a description of one structure of an elementary instruction block. The first field identifies the mechanism function address, e.g. 53. The next six fields contain the numerical identifiers of six input signals that may be tested. These fields may represent a predetermined logical combination of the tested inputs. The next four fields contain numerical identifiers of output signals that may be turned on or turned off. The next field contains the magnitude of a programmed dwell in 100 millisecond increments. The next field identifies the numerical identifier of the response input signal, and the last field contains the magnitude of the response dwell associated with the response input signal.

Referring to process step 412 of FIG. 13, mechanism function 53 will recall an elementary instruction block for shifting the chain drive to tool store A. In the block, a number identifying the absence of an input signal representing an alignment pin limit switch is the only input programmed. The alignment pin holds the tool store and chain drive in a fixed position. The block contains the numerical identifier of one output to be turned on—shift the drive to tool store A, and the numerical identifier of one output to be turned off—shift the drive to tool store B. The numerical identifier of a limit switch signal detecting the connection of the drive to tool store A is programmed as the response input, and six seconds are provided as a response dwell in which to shift the drive to tool store A. The execution of a mechanism function was described earlier in relation to FIG. 7.

The process of FIG. 13 continues to step 414 which is auxiliary function 44 and determines the direction of motion of the tool store A in moving to the new tool number. Given the new location of the tool store and its present location, the shortest path and hence the direction of rotation may be determined. At this point, the tool store may be rotated by processes 50 or 52 shown in process steps 424 and 418, respectively. In either case, process step 426 defines a process inhibit in which the elementary instruction block contains the process inhibit character I and an arbitrary number −10. The negative identifier causes the process of FIG. 13 to stop. Assume the tool chain is to rotate clockwise. Process 50 which is illustrated by the flow chart in FIG. 14, will be executed, incrementing the tool store one location at a time, until the new tool location is found by auxiliary function 64 in process step 442. Process step 444 inserts the alignment pin locking the tool store in position, and process step 427 has an elementary instruction block comprised of I 10. The positive identifier releases the process previously inhibited by negative identifier process step 426 of FIG. 13. Process step 428 is now free to allow the new tool to be removed from tool store A.

Figure 14:
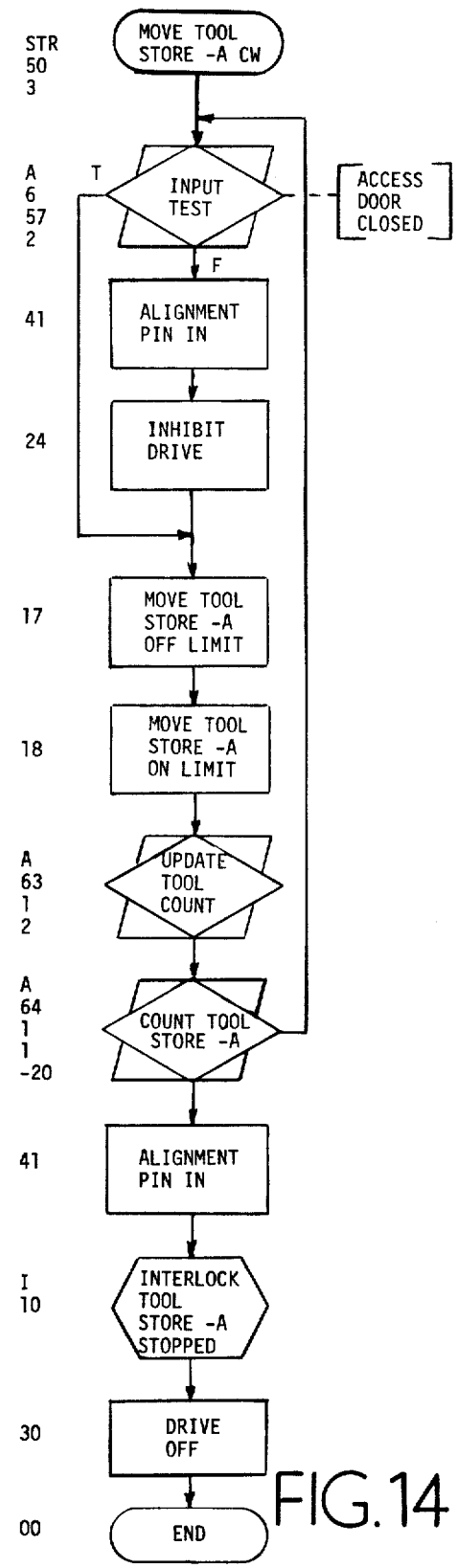
FIG. 14 is a flow chart illustrating the machine tool builder logic required to move the tool store in a clockwise direction.

It should be noted that FIG. 14 represents a motion of tool store A in a clockwise direction. If process step 414 of FIG. 13 determines that a counterclockwise rotation was necessary, a process similar to that disclosed in FIG. 14 would be executed with the exception that all elements associated with a clockwise rotation would be replaced by elements associated with a counterclockwise rotation.

In the manner described with reference to FIGS. 12, 13 and 14, a machine builder can define a number of processes comprised of mechanism functions, auxiliary functions, other machine processes and process inhibits. In order to describe a complete cycle of operation of a machine in a manner similar to that described in reference to FIGS. 12 and 13, these processes may be represented by some type of code. This code may then be processed, compiled and integrated into a computer numerical control system load tape. Further, any of the defined processes may be corrected or modified by utilizing certain of the editing capabilities typically found on most computer numerical controls The disclosed system illustrates the use of the mechanism controller in association with a computer numerical control. This illustration should not be considered a limitation of the application of the mechanism controller as described herein, the operation of the mechanism controller is independent of but under the command of the computer numerical control. One who is skilled in the art may readily implement the mechanism controller in any computer based control.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. A method for executing machine processes using a control computer, said computer having a memory and generating constact period timing signals and process signals to initiate the machine processes during the execution of a machine cycle of operation, said control including a machine interface for receiving the states of input signals produced by condition sensing devices and transmitting output signals to actuate mechanisms to execute a process function, the method comprising the steps of:

(a) storing a program in the memory defining a number of independent processes, each process being uniquely identified by a process signal and represented by a series of instruction blocks of process information, a number of the instruction blocks defining an output signal to be produced in response to a predetermined set of states of input signals;

(b) storing a process signal generated by the control;

(c) recalling from the memory a first of the number of instruction blocks associated with the stored process signal in response to a first timing signal;

(d) testing the machine interface to detect the actual set of states of selected input signals defined by the first instruction block;

(e) comparing the actual states of the selected input signals with the predetermined set of states;

(f) transferring the output signal to the machine interface in response to the detected set of states of the selected input signals corresponding to the predetermined set of states;

(g) generating an error signal identifying the ones of these selected input signals having actual states different from the predetermined states;

(h) iterating steps (c) through (g) for each of the number of instruction blocks stored in association with the first stored process signal; and (i) iterating steps (b) through (h) for each of the process signals generated by the control computer.

2. The method of claim 1, wherein the method further comprises the steps of:

(a) storing a programmed dwell representing a timed interval varying between predetermined minimum and predetermined maximum time limits as part of some of the number of instruction blocks;

(b) delaying the step of testing the machine interface in response to an instruction block having a first programmed dwell;

(c) measuring a first timed interval by detecting successive timing signals after the first timing signal;

(d) comparing the first timed interval with the first programmed dwell;

(e) initiating the step of testing the machine interface in response to the first timed interval being equal to the programmed dwell; and (f) iterating steps (b) through (e) for each of the number of the instruction blocks having a programmed dwell.

3. The method of claim 1, wherein the method further comprises the steps of:

(a) storing the desired state of a response signal and a response dwell as part of the number of instruction blocks;

(b) testing the machine interface in response to the output signal being transferred to the machine interface to detect the actual state of the response signal;

(c) measuring a second timed interval by detecting successive timing signals in response to the output signal being transferred to the machine interface;

(d) comparing the second timed interval with the response dwell;

(e) comparing the actual state of the response signal with the desired state prior to the expiration of the response dwell;

(f) producing a second error signal identifying the response signal in response to the response signal having an actual state different from the desired state at the expiration of the response dwell; and (g) iterating steps (b) through (f) for each of the number of instruction blocks containing a response signal and a response dwell.

4. A method for executing a machine cycle of operation using a computer control associated with a machine, said control having a memory and generating constant period timing signals and process signals to initiate machine processes defining the machine cycle of operation, said control further including a machine interface for receiving the states of input signals produced by condition sensing devices on the machine defining a machine operating state and transmitting output signals to actuate mechanisms on the machine to execute a machine function, the method comprising the steps of:

(a) storing in the memory a program defining a number of independent machine processes, each machine process being uniquely identified by a process signal and represented by a series of instruction blocks of machine function information, a number of the instruction blocks defining an output signal to be produced in response to a predetermined set of states of input signals;

(b) storing the process signals generated by the control in a sequence dependent on the process signals thereby creating a number of active machine processes;

(c) generating a dwell signal representing a predetermined timed interval for each of the active machine processes;

(d) storing the dwell signals in a sequence corresponding to the sequence of stored process signals;

(e) measuring the timed interval of the stored dwell signals by counting successive occurrences of the timing signal;

(f) detecting each dwell signal sequentially during each timing signal to detect the expiration of the dwell signal;

(g) recalling a first of the number of instruction blocks having an expired dwell signal;

(h) testing the machine interface to detect the actual set of states of input signals associated with the first instruction blocks;

(i) transferring output signals to the machine interface in response to the actual set of states of the input signals being equal to the predetermined set of states;

(j) generating an error signal in response to the actual set of states of the input signals being different from the predetermined set of states;

(k) iterating steps (g) through (j) for each of the number of instruction blocks having expired dwell times;

(l) iterating steps (b) through (k) to execute all the machine processes defining the cycle of operation.

5. A method for executing a machine cycle using a computer numerical control associated with the machine, said computer numerical control having a memory and generating constant period timing signals and process signals to initiate machine processes defined by the machine cycle, said computer numerical control further including a machine interface for receiving the states of input signals produced by condition sensing devices on the machine defining a machine operating state and transmitting output signals to actuate mechanisms on the machine to execute a machine function, and means for displaying messages, the method comprising the steps of:

(a) storing in the memory a machine cycle program defining a number of indepedent machine processes, each machine process being uniquely identified by a process signal, assigned a process level identifier and represented by a series of instruction blocks of machine function information, a number of the instruction blocks defining an output signal to be produced in response to a predetermined set of states of input signals;

(b) storing the process signals generated by the control in a sequence determined by the process level identifiers;

(c) queuing the process signals having a process level identifier common to a stored process signal;

(d) generating a first dwell signal in response to each process signal being stored;

(e) storing the first dwell signals in the predetermined sequence corresponding to the stored process signals;

(f) periodically and sequentially decrementing the values represented by the dwell signals by predetermined increments in response to successive timing signals;

(g) sequentially detecting the stored dwell signals to determine a zero value;

(h) recalling from memory a first of the number of instruction blocks associated with one of the process signals in response to a corresponding dwell signal having a zero value;

(i) testing the machine interface to detect the actual states of the input signals associated with the first instruction block;

(j) storing a second dwell signal in place of the first dwell signal having a zero value;

(k) iterating steps (f) and (g);

(l) comparing the actual states of the input signals with the predetermined states of the input signals in response to the second dwell signal having a zero value;

(m) displaying an error message identifying the input signals having actual states different from the predetermined states;

(n) transferring an output signal associated with the first instruction block to the machine interface in response to the input signals having actual states corresponding to the predetermined states, said output signals causing the execution of a machine function;

(o) iterating steps (h) through (n) for each of the number of instruction blocks associated with one of the process signals;

(p) iterating steps (f) through (o) to execute all of the stored process signals;

(q) periodically recalling each queued process signal and storing said process signals in response to the completion of a process having a common process level identifier; and (r) iterating steps (d) through (q) for all of the queued process signals.

6. The method of claim 5 wherein said method further comprises the steps of:

(a) storing as part of the number of instruction blocks a predetermined state of response signal resulting from the execution of the machine function generated by the output signal and a third dwell signal representing a timed interval for executing the machine function;

(b) testing the machine interface to detect the actual state of the response signal in response to transferring the output signal to the machine interface;

(c) storing third dwell signal in place of the corresponding second dwell signal;

(d) periodically decrementing the value represented by the third dwell signal by the predetermined increments in response to successive timing signals;

(e) comparing the actual state of the response signal with the predetermined state prior to the third dwell signal being decremented to zero;

(f) displaying an error signal identifying the response signal in response to the actual state of the response signal being different from the predetermined state in response to the third dwell signal having a zero value.

7. An apparatus for use with a computer numerical control coupled to devices on an associated machine via a machine interface for controlling the operation of machine based processes, said numerical control having a memory, system timers for generating constant period timing signals and means for generating process signals to initiate machine processes for controlling the machine operation, said numerical control further including a machine interface for receiving input signals being generated by condition sensing devices on the machine and transmitting output signals to actuate mechanisms on the machine thereby executing a machine function, the apparatus comprising:

(a) a first means for storing a program in the memory defining a number of independent machine processes, each machine process being uniquely identified by a process signal, assigned a process level identifier and represented by a series of instruction blocks of machine function information;

(b) second means coupled to the first storage means for storing mechanism function instruction block data associated with a first number of the instruction blocks, said data defining an output signal to be produced in response to a predetermined set of states of selected input signals;

(c) an active process table having a predetermined number of table levels;

(d) process queuing means responsive to the process signals for storing some of the process signals in the unfilled table levels of the active process table corresponding to the process level identifiers and other process signals in a queue having process level identifiers corresponding to filled table levels of the active process table;

(e) an instruction block identifier table having the predetermined number of table levels;

(f) a dwell table having the predetermined number of table levels;

(g) a return instruction table having the predetermined number of table levels;

(h) a process activating means responsive to the timing signals and the process queuing means for (1) storing the process signals in the active process table at table levels corresponding to the process level identifier, (2) storing block identifier signals in levels of the instruction block identifier table associated with the respective process level identifiers of stored process signals, said block identifier signal defining the next instruction block to be executed in the machine process corresponding to the process signal, (3) storing first dwell signals representing predetermined timed intervals in levels of the dwell table corresponding to respective process level identifiers of the stored process signals, and (4) storing process execute instructions in levels of the return instruction table having first dwell signals stored in corresponding levels of the dwell table;

(i) process timer means connected to the dwell table and operating continuously in response to each occurrence of the timing signal for (1) sequentially decrementing the magnitude of each dwell signal by a predetermined increment in response to each occurrence of the timing signal, and (2) detecting when each dwell signal is decremented to a zero value;

(j) process execute control means connected to the return instruction table, the instruction block identifier table and the second storing means for (1) recalling mechanism function instruction block data associated to the corresponding block identifier signals in response to corresponding first dwell signals having a zero value, (2) identifying to the machine interface input signals associated with the recalled mechanism function instruction block data, (3) interrogating the machine interface to compare the actual states of the input signals with the predetermined states, (4) generating error signals identifying input signals associated with each set of mechanism function instructions block data having actual input signal states different from the predetermined input signal states, (5) transferring to the machine interface output signals associated with each set of mechanism function instruction block data having actual input signal states equal to the predetermined input signal states, and (6) storing new block identifier signals in the instruction block identifier table representing the next instruction block to be executed thereby executing the instructions blocks for all the processes stored in the active process table.

8. The apparatus of claim 7 wherein the mechanism function instruction block data includes a programmed dwell signal representing a timed interval delay to occur prior to the input test and the process execute control means includes further means responsive to recalling the mechanism instruction block data for (1) storing programmed dwell signals in the dwell table at levels corresponding to the levels of the first dwell signals having a zero value, and (2) storing identify input instructions in the return instruction table at levels corresponding to the levels of the programmed dwell signals thereby executing the programmed dwell prior to testing the states of the input signals.

9. The apparatus of claim 8 wherein the mechanism function instruction block data further comprises a predetermined response signal state representing the successful execution of the mechanism function initiated by the output signal and a response dwell signal defining a timed interval within which the mechanism function must be executed and the process execute control means further comprises means responsive to transferring output signals to the machine interface for (1) identifying the response signals to the machine interface, (2) storing the response dwell signals in the dwell table at levels corresponding to the levels of the second dwell signals having a zero value, (3) storing an error instruction in the return instruction table at levels corresponding to the response dwell signals, said error instructions identifying the corresponding response signals, (4) interrogating the machine interface in response to each timing signal to compare the actual state of the response signal to the predetermined state, (5) clearing the error instruction from the return instruction table in response to the actual state of the response signal being equal to the predetermined state thereby causing a response error signal in response to the actual and predetermined states of the response signal maintaining an unequality throughout the response dwell period.

10. An apparatus for use with a computer control system for controlling the operation of a machine by receiving input signals from sensing devices and transmitting output signals to actuating devices, said system being responsive to inputs received from manually operated devices into workpiece processing programs, the apparatus comprising:

(a) first storage means for storing a plurality of series of signals representing elementary instruction blocks and machine process identifiers, each series of elementary instruction blocks constituting a machine process having a unique process identifier;

(b) second storage means coupled to said first storage means for storing signals representing information and instructions making up elementary instruction blocks required to carry out machine functions;

(c) request means selectively responsive to a workpiece processing program and to input signals from manually operated devices for producing process request signals identifying ones of the machine processes as requested processes and to inhibit control system execution of operations dependent on completion of requested processes;

(d) active process storage means for storing the machine process identifier signals of the ones of the requested processes which are concurrently executable;

(e) first timing means responsive to the request means for periodically recalling process identifier signals from the first storage means and transferring them to the active process storage means;

(f) instruction block point means coupled to the first storing means for indicating which of the instruction blocks of the active processes are to be next executed;

(g) comparing means for determining concurrence between input signals from sensing devices and signals, recalled from the second storage means, representing the sensing device states required for execution of a machine function;

(h) error indicating means coupled to said comparing means for generating an error signal in response to determination of nonconcurrence between the actual states of ones of the sensing devices and the required states;

(i) output activating means for generating signals to be transmitted to actuating devices to alter the states thereof as required by elementary instruction blocks;

(j) execution controlling means for updating the contents of the instruction block pointer means in response to the completion of execution of elementary instruction blocks; and (k) system cycle release means for producing a signal in response to the completion of execution of all requested processes for enabling continuation of control system operations inhibited during the execution of the machine processes.

11. The apparatus of claim 10 further comprising:

(a) queuing storage means coupled to the active process storage means and responsive to the first timing means for storing machine process identifier signals representing requested machine processes which cannot be executed concurrently with at least one of the active processes; and (b) queue processing means responsive to the first timing means for transferring the active storage means those process identifier signals stored in the queue representing machine processes which can be executed concurrently with all other active processes.

12. The apparatus of claim 11 further comprising:

(a) process execution control means for (1) generating signals to initiate delay intervals thereby accommodating real time operating requirements of the computer control, (2) generating signals to initiate operation of the comparing means, the error indicating means and the output activating means in response to the elementary instruction blocks recalled from the second storing means, (b) second timing means for measuring and determining the expiration of the delay intervals initiated in response to the instructions recalled from the second storage means and to signals generated by the process execution control means;

(c) return instruction means responsive to the second timing means and coupled to the process execution control means for identifying the operation to be performed upon expiration of the delay intervals.

13. In a machine control system utilizing a computer and including machine device interfaces coupled to sensing devices, actuating devices and manually operable input devices and devices for recalling and decoding workpiece programs recorded on a variety of media, and including memory in which elementary instruction blocks including mechanism function blocks and machine process blocks making up a plurality of sequences representing machine processes are stored, the method of executing the machine processes comprising the steps of:

(a) requesting the execution of machine processes in response to instructions of the workpiece program or in response to the actuation of manually operable input devices or in response to the presence of a machine process block within a machine process;

(b) recalling, from the memory, signals representing data identifying a mechanism function block of one of the requested machine processes;

(c) testing the mechanism function block for the presence of signals representing an input test instruction;

(d) recalling signals from a sensing device interface representing the actual states of the sensing devices specified in the input test instruction;

(e) comparing the actual states with a plurality of combinations of predetermined states stored with the input test instruction;

(f) generating an error signal in response to detecting nonconcurrence between the actual states and all combinations of the predetermined states;

(g) testing the mechanism function block for the presence of an output instruction in response to detecting concurrence between the actual states and at least one combination of the predetermined states;

(h) transferring an output instruction signal to an interface of a machine actuating device in response to detecting the presence of the output instructions in the machine function block;

(i) iterating steps (b) through (h) for all mechanism function blocks of the requested machine processes until all mechanism function blocks have thereby been executed.

14. In a machine control system utilizing a computer including programmable timing devices for generating timing signals, machine device interfaces coupled to sensing devices, actuating devices, and manually operable input devices, and devices for recalling and decoding workpiece programs recorded on a variety of media and including a memory including an instruction block pointer table, an active process table and an interlock table and in which signals representing elementary instruction blocks including mechanism function blocks, auxiliary function blocks, process inhibit blocks to which are appended arguments in matchable pairs and machine process blocks making up a plurality of sequences representing machine processes are stored, the method of executing the machine processes comprising the steps of:

(a) requesting the execution of machine processes in response to the instructions of the workpiece program or in response to the actuation of manually operable input devices or in response to the presence of a machine process block within a machine process;

(b) storing signals identifying the requested processes in an active process table in response to a first timing signal;

(c) storing signals representing initial values which indicate the next instruction blocks to be executed in an instruction block pointer table in response to the first timing signal;

(d) recalling, from the memory, signals representing instructions of a first mechanism function block as indicated by the value of the entry in the instruction block pointer table corresponding to a first active process;

(e) replacing the entry in the instruction block pointer table corresponding to the first active process with a new value indicating a second mechanism function block of the first active process;

(f) testing the first mechanism function block for the presence of signals representing a dwell instruction;

(g) initiating a first delay interval in response to detecting the presence of the dwell instruction;

(h) testing the first mechanism function block for the presence of signals representing an input test instruction in response to a second timing signal indicating expiration of the first delay interval;

(i) recalling signals from a sensing device interface representing the actual states of the sensing devices specified in the input test instruction;

(j) comparing the actual states with a plurality of combinations of predetermined states stored with the input test instruction;

(k) generating an error signal in response to detecting nonconcurrence between the actual states and all combinations of the predetermined states;

(l) testing the mechanism function block for the presence of an output instruction in response to detecting concurrence between the actual states and at least one combination of the predetermined states;

(m) transferring an output instruction signal to an interface of a machine actuating device in response to detecting the presence of the output instruction;

(n) iterating steps (b) and (c) for all requested processes;

(o) iterating steps (d) through (m) for all instruction blocks of all active processes.

15. The method of claim 14 further comprising the steps of:

(a) testing the mechanism function block for the presence of signals representing a response test instruction;

(b) initiating a second delay interval in response to detecting the presence of the response test instruction;

(c) recalling a second signal from a sensing device interface representing the response input actual state of the sensing device specified in the response test instruction;

(d) comparing the response input actual state with a response input predetermined state stored with the response test instruction;

(e) terminating the second delay interval prior to expiration thereof in response to detecting concurrence between the response input actual state and the response input predetermined state;

(f) generating a second error signal in response to expiration of the second delay interval.

16. The method of claim 15 further comprising the steps of:
(a) discontinuing the iteration of steps (h) through (m) of claim 14 for a first active process in response to the initiation of a first delay interval;
(b) enabling the generation of additional process execution requests during the first delay interval;
(c) executing steps (b) and (c) of claim 14 for the processes identified by the additional requests generated during the first delay interval;
(d) iterating the steps (d) through (m) of claim 14 for a second active process until an instruction is executed initiating another delay interval thereby discontinuing iteration of steps (d) through (m) of claim 14 for the second active process;
(e) iterating steps (a) through (d) thereby effecting the execution of instructions of a plurality of processes in a concurrent fashion;
(f) resuming the iteration of steps (h) through (m) of claim 14 for the first active process in response to the generation of the second timing signal associated with the first active process.

17. The method of claim 16 further comprising the steps of:
(a) recalling from the memory an auxiliary function instruction block in response to the value of an entry in the instruction pointer table associated with the corresponding machine process;
(b) testing the machine interface for the state of an input signal in response to an instruction stored with the auxiliary function;
(c) updating the value of the associated instruction block pointer table entry by an amount stored as part of the auxiliary function sufficient to cause the next recalled instruction block to be other than the next instruction block in the sequence defined by the corresponding machine process in response to detecting that the input signal state was not equal to a predetermined state;
(d) updating the value of the associated instruction block pointer table entry by an amount sufficient to cause the next recalled instruction block of the corresponding machine process to be the next instruction in the sequence defined by that machine process in response to detecting that the input signal state was equal to a predetermined state.

18. The method of claim 17 further comprising the steps of:
(a) recalling from the memory an auxiliary function instruction block in response to the value of an entry in the instruction block pointer table associated with the corresponding machine process;
(b) updating the value of the associated instruction block pointer table entry by an amount stored as part of the auxiliary function instruction block sufficient to cause the next recalled instruction block to be other than the next instruction block in the sequence established by the corresponding machine process.

19. The method of claim 18 further comprising the steps of:
(a) recalling from the memory a process inhibit block to which is appended a first argument;
(b) storing signals representing the first argument in an interlock table thereby creating a first entry therein;
(c) testing all other entries in the interlock table for the presence of a second argument constituting a match for the first argument;
(d) disabling the recalling from memory of other instruction blocks making up the machine process corresponding to the process inhibit block associated with the first argument in response to detecting the absence of a matching entry in the interlock table;
(e) replacing the first interlock table entry with an initialization value and enabling the recalling from memory of further instruction blocks making up the corresponding machine process in response to detecting the presence of a matching entry.

20. The method of claim 19 further comprising the steps of:
(a) recalling from the memory a process inhibit block having a second argument;
(b) storing signals representing the second argument in the interlock table,
(c) testing all other entries in the interlock table for the presence of first arguments constituting matches for the second argument;
(d) replacing all matching argument entries with an initialization value and enabling the recalling from memory of the next instruction blocks of the corresponding machine processes;
(e) resuming the recalling of instruction blocks for all active processes the execution of which have not been disabled as a result of the presence of unmatched first argument entries in the interlock table.

* * * * *